US005297019A

United States Patent [19]

Zuehlke

[11] Patent Number: 5,297,019

[45] Date of Patent: Mar. 22, 1994

[54] CONTROL AND HYDRAULIC SYSTEM FOR LIFTCRANE

[75] Inventor: Arthur G. Zuehlke, Manitowoc, Wis.

[73] Assignee: The Manitowoc Company, Inc., Manitowoc, Wis.

[21] Appl. No.: 566,751

[22] Filed: Aug. 13, 1990

Related U.S. Application Data

[63] Continuation-in-part of Ser. No. 418,879, Oct. 10, 1989, Pat. No. 5,189,605.

[51] Int. Cl.[5] ........................ G05B 11/01; G06B 11/32

[52] U.S. Cl. ................................ 364/140; 364/424.07

[58] Field of Search .................... 364/140, 424.07, 175; 60/327, 426, 328, 443, 469, 459, 466; 91/207; 340/685; 180/234

[56] References Cited

U.S. PATENT DOCUMENTS

| | | | |
|---|---|---|---|
| 3,851,766 | 12/1974 | Gill et al. | 60/426 |
| 4,178,591 | 12/1979 | Geppert | 340/685 |
| 4,185,280 | 1/1980 | Wihelm | 364/424.07 |
| 4,268,013 | 5/1981 | Khan | 91/207 |
| 4,489,551 | 12/1984 | Watanabe et al. | 60/328 |
| 4,510,750 | 4/1985 | Izumi et al. | 60/443 |
| 4,514,796 | 4/1985 | Saulters et al. | 340/685 |
| 4,532,595 | 7/1985 | Wilhelm | 340/685 |
| 4,782,662 | 11/1988 | Reeves et al. | 60/327 |
| 4,815,614 | 3/1989 | Putkonen et al. | 340/685 |
| 4,945,472 | 2/1991 | Hayashi et al. | 180/234 |
| 4,953,723 | 9/1990 | Saotome et al. | 60/469 |
| 4,969,562 | 11/1990 | Saotome | 60/469 |
| 5,029,067 | 7/1991 | Nishida et al. | 364/175 |
| 5,034,892 | 7/1991 | Saotome | 364/424.07 |
| 5,160,056 | 11/1992 | Yoshimatsu et al. | 212/155 |

FOREIGN PATENT DOCUMENTS

| | | |
|---|---|---|
| 0076485A1 | 4/1983 | European Pat. Off. . |
| 0253657A2 | 1/1988 | European Pat. Off. . |
| 3115471A1 | 10/1982 | Fed. Rep. of Germany . |
| 3611553C1 | 7/1987 | Fed. Rep. of Germany . |
| 0364994A1 | 10/1989 | Fed. Rep. of Germany . |
| 72.00064 | 1/1972 | France . |

OTHER PUBLICATIONS

The Liebherr "Technical Data Cable Excavator" at page 3, column 1. date Oct. 1986.

The Liebherr "Technical Description" HS 840, HS 850, HS 870. date Apr. 1985.

*Primary Examiner*—Jerry Smith

*Assistant Examiner*—Jim Trammell

*Attorney, Agent, or Firm*—Willian Brinks Hofer Gilson & Lione

[57] ABSTRACT

An improved control system for operation of a liftcrane having mechanical subsystems powered by a engine and connected thereto by a closed loop hydraulic system with one or more individual closed hydraulic loops. The liftcrane includes controls for outputting signals for operation of the mechanical subsystems and a programmable controller connected and responsive to the controls and connected to the mechanical subsystems. The programmable controller is capable of running a routine for controlling the mechanical subsystems. A first set of sensors is operable to sense the pressure in the closed loop hydraulic system at each of the mechanical subsystems in a first set of mechanical subsystems and provide an output to the programmable controller indicative of the hydraulic pressure sensed. A second set of sensors is operable to sense the position or speed of each of the mechanical subsystems in a second set of mechanical subsystems and provide an output to the programmable controller indicative of the position sensed.

23 Claims, 5 Drawing Sheets

CONTROL AND HYDRAULIC SYSTEM FOR LIFTCRANE

REFERENCE TO RELATED APPLICATION

This application is a continuation-in-part of U.S. Ser. No. 07/418,879, filed on Oct. 10, 1989 U.S. Pat. No. 5,189,605.

BACKGROUND OF THE INVENTION

This invention relates to liftcranes and more particularly to an improved control and hydraulic system for a liftcrane.

A liftcrane is a type of heavy construction equipment characterized by an upward extending boom from which loads can be carried or otherwise handled by retractable cables. Liftcranes are available in different sizes. The size of a liftcrane is associated with the weight (maximum) that the liftcrane is able to lift. This size is expressed in tons, e.g. 50 tons.

The boom is attached to the upper works of the liftcrane. The upper works are usually rotatable upon the lower works of the liftcrane. If the liftcrane is mobile, the lower works may include a pair of crawlers (also referred to as tracks). The boom is raised or lowered by means of a cable and the upper works also include a drum upon which the boom cable can be wound. Another drum (referred to as a hoist drum) is provided for cabling used to raise and lower a load from the boom. A second hoist drum (also referred to as the whip hoist drum) is usually included rearward from the first hoist drum. The whip hoist is used independently or in association with the first hoist. Different types of attachments for the cabling are used for lifting, clamshell, dragline and so on. Each of these combinations of drums, cables and attachments, such as the boom or clam shell are considered herein to be mechanical subsystems of the liftcrane. Additional mechanical subsystems may be included for operation of a gantry, the tracks, counterweights, stabilization, counterbalancing and swing (rotation of the upper works with respect to the lower works). Mechanical subsystems in addition to these may also be provided.

As part of the upper works, a cab is provided from which an operator can control the liftcrane. Numerous controls such as levers, handles, knobs, and switches are provided in the operator's cab by which the various mechanical subsystems of the liftcrane can be controlled. Use of a liftcrane requires a high level of skill and concentration on the part of the operator who must be able to simultaneously manipulate and coordinate the various mechanical systems to perform routine operations.

The two most common types of power systems for liftcranes are friction-clutch and hydraulic. In the former type, the various mechanical subsystems of the liftcrane connect by means of clutches that frictionally engage a drive shaft driven by the liftcrane engine. The friction-clutch liftcrane design is considered generally older than the hydraulic type of liftcrane design.

In hydraulic systems, an engine powers a hydraulic pump that in turn drives an actuator (such as a motor or cylinder) associated with each of the specific mechanical subsystems. The actuators translate hydraulic pressure forces to mechanical forces thereby imparting movement to the mechanical subsystems of the liftcrane.

Hydraulic systems used on construction machinery may be divided into two types—open loop and closed loop. Up until now, most hydraulic liftcranes use primarily an open loop hydraulic system. In an open loop system, hydraulic fluid is pumped (under high pressure provided by a pump) to the actuator. After the hydraulic fluid is used in the actuator, it flows back (under low pressure) to a reservoir before it is recycled by the pump. The loop is considered "open" because the reservoir intervenes on the fluid return path from the actuator before it is recycled by the pump. Open loops systems control actuator speed by means of valves. Typically, the operator adjusts a valve to a setting to allow a portion of flow to the actuator, thereby controlling the actuator speed. The valve can be adjusted to supply flow to either side of the actuator thereby reversing actuator direction.

By contrast, in a closed loop system, return flow from an actuator goes directly back to the pump; i.e., the loop is considered "closed". Closed loop systems control speed and direction by changing the pump output.

Up until now, open loop systems have been generally favored over closed loop systems because of several factors. In an open loop system, a single pump can be made to power relatively independent, multiple mechanical subsystems by using valves to meter the available pump flow to the actuators. Also, cylinders, and other devices which store fluid, are easily operated since the pump does not rely directly on return flow for source fluid. Because a single pump usually operates several mechanical subsystems, it is easy to bring a large percentage of the liftcrane's pumping capability to bear on a single mechanical subsystem. Auxiliary mechanical subsystems can be easily added to the system.

However, open loop systems have serious shortcomings compared to closed loop systems, the most significant of which is lack of efficiency. A liftcrane is often required to operate with one mechanical subsystem fully loaded and another mechanical subsystem unloaded yet with both turning at full speed, e.g. in operations such as clamshell, grapple, level-luffing. An open loop system having a single pump must maintain pressure sufficient to drive the fully loaded mechanical subsystem. Consequently, flow to the unloaded mechanical subsystems wastes an amount of energy equal to the unloaded flow multiplied by the unrequired pressure.

Open loop systems also waste energy across the valves needed for acceptable operation. For example, the main control valves in a typical load sensing, open loop system (the most efficient type of open loop system for a liftcrane) dissipates energy equal to 300–400 PSI times the load flow. Counterbalance valves required for load holding typically waste energy equal to 500–2,000 PSI times the load flow.

As a result of the differences in efficiency noted above, a single pump open loop system requires considerably more horsepower to do the same work as a closed loop system. This additional horsepower could easily consume thousands of gallons of fuel annually. Moreover, all this wasted energy converts to heat. It is no surprise, therefore, that open loop systems require larger oil coolers than comparable closed loop systems.

Controllability can be another problem for open loop circuits. Since all the main control valves are presented with the same system pressure, the functions they control are subject to some degree of load interference, i.e., changes in pressure may cause unintended changes in actuator speed. Generally, open loop control valves are pressure compensated to minimize load interference. But none of these devices are perfect and speed changes of 25% with swings in system pressure are not atypical. This degree of speed change is disruptive to liftcrane operation and potentially dangerous.

To avoid having to use an extremely large pump, many open loop systems have devices which limit flow demand when multiple mechanical subsystems are engaged. Such devices, along with the required load sensing circuits and counterbalance valves mentioned above, are prone to instability. It can be very difficult to adjust these devices to work properly under all the varied operating conditions of a liftcrane.

An approach taken by some liftcranes manufacturers with open loop systems to minimize the aforementioned problems is to use multi-pump open loop systems. This approach surrenders the main advantage that the open loop has over closed loop, i.e. the ability to power many functions with a single pump.

In summary, although presently available liftcranes generally use open loop hydraulic systems, these are very inefficient and this inefficiency costs the manufacturers by requiring large engines and oil coolers and it costs the user in the form of high fuel bills. Moreover, another disadvantage is that open loop systems in general can have poor controllability under some operating conditions.

SUMMARY OF THE INVENTION

The present invention provides an improved control system for a liftcrane. The liftcrane has mechanical subsystems powered by a engine-driven closed loop hydraulic system. The liftcrane also includes controls for outputting signals for operation of the mechanical subsystems and a programmable controller connected and responsive to the controls and connected to the mechanical subsystems. The programmable controller is capable of running a routine for controlling the mechanical subsystems. A first set of sensors is operable to sense the pressure in the closed loop hydraulic system at each of the mechanical subsystems in a first set of mechanical subsystems and provide an output to the programmable controller indicative of the hydraulic pressure sensed at each of these mechanical subsystems. A second set of sensors is operable to sense the position or speed of each of the mechanical subsystems in a second set of mechanical subsystems and provide an output to the programmable controller indicative of the position or speed sensed at each of the mechanical subsystems of the second set of mechanical subsystems.

DESCRIPTION OF PRESENTLY PREFERRED EMBODIMENTS

Figure 1:
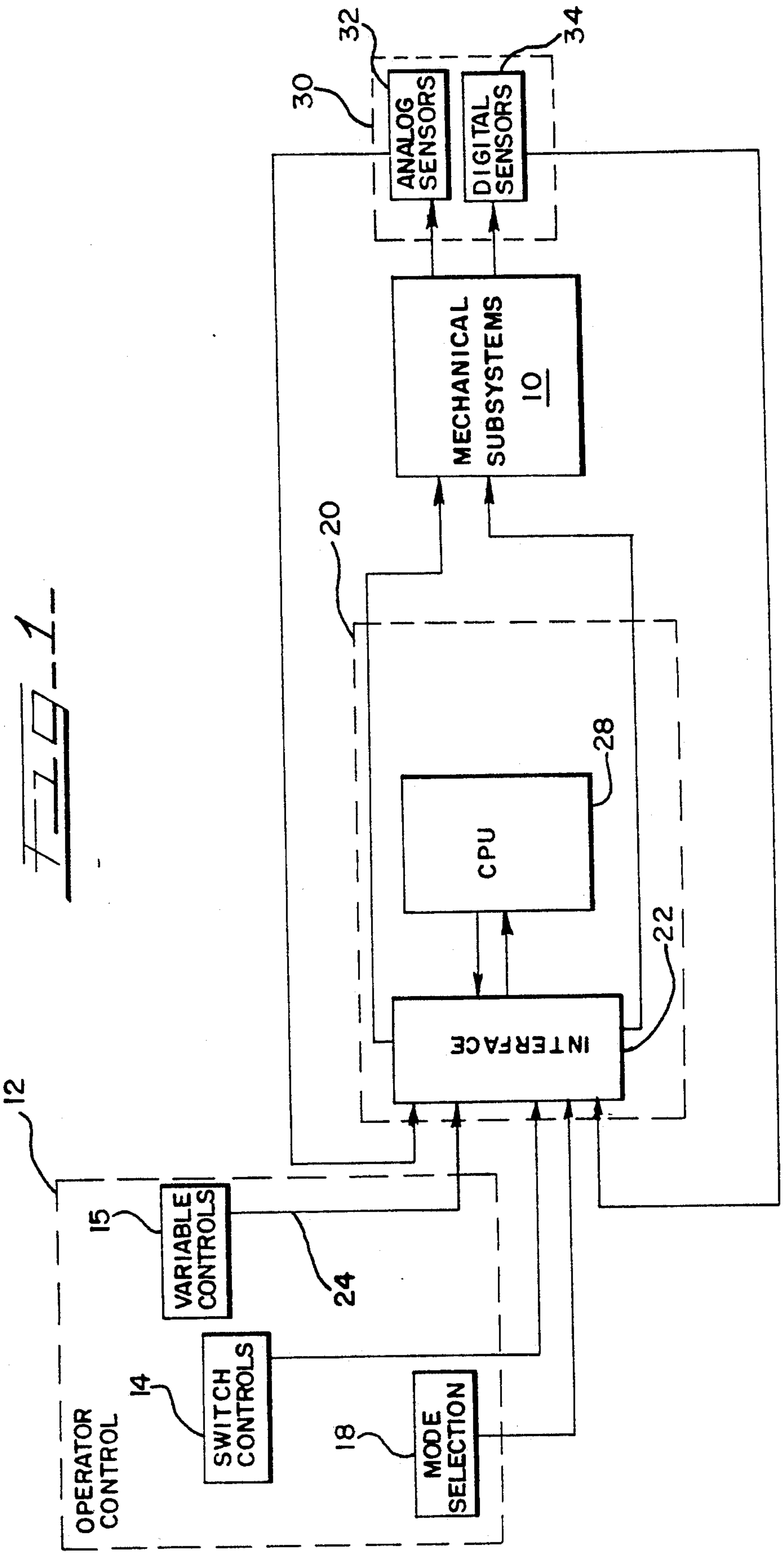
FIG. 1 is a flow chart depicting the control system of an embodiment of the present invention.

FIG. 1 depicts a flow chart of an embodiment of an improved control system for a liftcrane. The various mechanical subsystems 10 of the liftcrane include pumps and actuators for the front hoist, rear hoist (whip), swing, boom, and left and right crawlers. In addition, there are subsystems for such things as counterweight handling, crawler extension, gantry raising, fan motors, warnings lights, visual display and so on. (As used herein, mechanical subsystems include those which may be characterized strictly as mechanical, e.g. booms, as well as others subsystems such as electrical gauges and video, but not limited to these). The mechanical subsystems 10 are under the control of an operator who occupies a position in the cab in the upper works of the liftcrane. In the cab are various operator controls 12 used for operation and control of the mechanical systems of the liftcrane. These operator controls 12 can be of various types such as switches, shifting levers etc., but can readily be divided into switch-type controls 14 (digital, ON/OFF) and variable controls 15 (analog or infinite position). The switch-type controls 14 are used for on/off type activities, such as setting a brake, whereas the variable controls 15 are used for activities such as positioning the boom, hoists, or swing. In addition, the operator controls 12 include a mode selector 18 whose function is to tailor the operation of the liftcrane for specific type of activities, as explained below. (For purposes of the control system of this embodiment, the mode selector 18 is considered to be a digital device even though there may be more than two modes available). In the present embodiment, the mode selection switch 18 includes selections for main hydraulic mode, counterweight handling mode, crawler extension mode, high speed mode, clamshell mode and free-fall mode. Some of these modes are exclusive of others (such as main hydraulic and free-fall) where their functions are clearly incompatible; otherwise these modes may be combined.

The outputs of the operator controls 12 are directed to a controller 20 and specifically to an interface 22 of the controller 20. The interface 22 receives signals 24 from each of the variable controls 15 and signals 26 and 27 from each of the switch-type controls 14 and the mode selector 18, respectively. The interface 22 in turn is connected to a CPU (central processing unit) 28. The interface 22 handles the signals 24, 26, and 27 in a similar manner. The controller 20 may be a unit such as the model IHC (Intelligent Hydraulic Controller) manufactured by Hydro Electronic Devices Corporation. The CPU 28 may be an Intel 8052. The controller 20 should be designed for heavy duty service under the conditions associated with outdoor construction activity.

The CPU 28 runs a routine which recognizes and interprets the commands from the operator (via the operator control 12) and outputs information back through the interface 22 directing the mechanical subsystems 10 to function in accordance with the operator's instructions. Movements, positions and other information about the mechanical subsystems 10 are monitored by sensors 30 which include both analog sensors 32 and switch-type sensors 34. Information from the sensors 30 is fed back to the interface 22 and in turn to the CPU 28. This information about the mechanical subsystems 10 provided by the sensors 30 is used by the routine running on the CPU 28 to determine if the liftcrane is operating properly.

The present invention provides significant advantages through the use of the controller 20. As mentioned above, high levels of skill and concentration are required of liftcrane operators to coordinate various liftcrane controls to perform even routine operations. Also, some liftcrane operations have to be performed very slowly to ensure safety. These operations can be very fatiguing and tedious. Through the use of the routine provided by the control system and running on the CPU 28, various complicated maneuvers can be simplified or improved.

One example of how the present invention can improve liftcrane operation is mode selection. Mode selection refers to tailoring the operation of the liftcrane for the particular task being performed. The mode selector 18 is set by the operator to change the way that the crane operates. The change in mode is carried out by the routine on CPU 28. With the change in mode, various of the operator controls 12 in the cab function in distinctly different ways and even control different mechanical subsystems in order that the controls are specifically suited to the task to be accomplished. With the change of mode, the routine can establish certain functional relationships between several separate mechanical subsystems for particular liftcrane activities (such as dragline or clamshell operations). Previously, such operations required sometimes difficult simultaneous coordination of several different controls by the operator.

Another example of how this embodiment of the invention can improve liftcrane operation is that the variable controls 15 can be set for either fine, precise, small-scale movements or for large-scale movements of the corresponding mechanical subsystems. Thus fewer and simpler controls may be needed in Still another example of how this embodiment of the invention improves liftcrane operation is in ease of maintenance and trouble-shooting. Instead of attempting to monitor each discreet mechanical subsystem, as in previous liftcranes, a mechanic can obtain information on all the mechanical subsystems of the liftcrane by connecting a computer (such as a laptop personal computer) to the controller and downloading the sensor data. Similarly, trouble-shooting could be accomplished by inputting specific control data directly to the controller, measuring the resultant sensor data, and comparing this to the expected sensor data.

Figure 2:
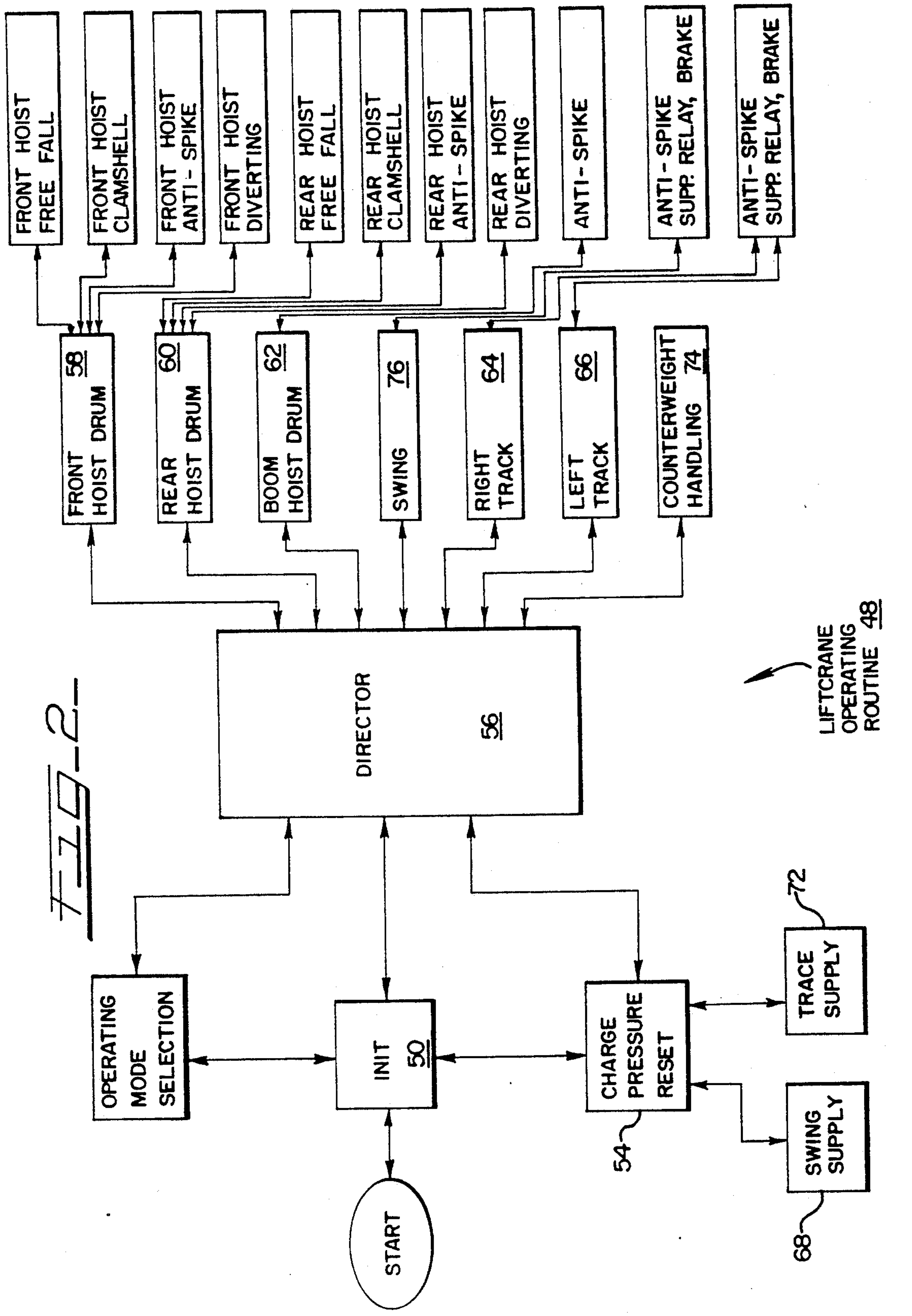
FIG. 2 is a flow chart of a liftcrane operating routine capable of running on the control system depicted in the embodiment in FIG. 1.

Referring to FIG. 2, there is depicted a flow chart of the liftcrane operating routine 48 of an embodiment the present invention. This routine is stored in the controller and may be stored in CPU 28. In this embodiment, the routine 48 is stored in EPROM, although other media for storage may be used. The source code for this routine in this first embodiment is set out in Appendix I. This routine set forth in Appendix I is specifically tailored for liftcrane standards in the Netherlands and includes provisions specifically directed to the safety standards there. However, the routine may also be used in the United States and in other countries or could easily be modified following the principles set out herein.

The liftcrane operating routine 48 is intended to run continuously on the CPU 28 (in FIG. 1) in a loop fashion. The liftcrane operating routine 48 on the CPU reads information provided from the interface 22 (in FIG. 1) which appears as data accessible to the routine at certain addresses. Output commands from the liftcrane operating routine 48 are transmitted from the CPU 28 to the interface 22 and there are converted to signals in the form required to operate the various mechanical subsystems.

In this embodiment of the liftcrane control system, when the liftcrane is initially turned on (or if the routine reboots itself or restores itself due to a transient fault), the liftcrane operating routine 48 includes an initialization subroutine 50 that initializes variables and reads certain parameters. Following this, an operating mode subroutine 52 reads data indicating which operating mode has been selected by the operator for the liftcrane. Next, a charge pressure reset/out of range subroutine 54 checks to determine if the hydraulic pressure in the liftcrane is in a proper operating range. Following this is a director subroutine 56 which is the main subroutine for the operation of the crane. From the director subroutine 56 the program branches into one of five subroutines associated with operation of the major mechanical subsystems. These subroutines control the function of the major mechanical subsystems with which they are associated: front hoist drum subroutine 58, rear hoist drum subroutine 60, boom hoist drum subroutine 62, right track subroutine 64, and left track subroutine 66. After these subroutines finish, the liftcrane operating routine 48 returns to the operating mode subroutine 52 and the starts all over again. As the routine cycles, changes made by the operator at the controls will be read by the liftcrane operating routine and changes in the operation of mechanical systems will follow. In addition, there are subroutines for swing supply and track supply that are run from the charge pressure reset/out-of-range subroutine 54. In the event that the pressure is not in the proper operating range, brakes will be applied to the swing and track to insure safety. A counterweight handling subroutine 74 branches from the director subroutine 56. A swing subroutine 76 also branches from the director subroutine 54. The swing subroutine 76 is called during each cycle of the director subroutine 54 to enhance a smooth movement of the swing.

A watchdog chip may be provided in controller 20 so that in the event of a failure of the operating routine, the CPU will reboot itself and start the initialization process 50 again.

To provide additional modes of operation or to alter the response of any of the components of the mechanical subsystems 10, the liftcrane operating routine 48 can be augmented or modified. For example, additional subroutines can be provided for new operating modes. One example is a level-luffing operating mode. Level-luffing refers to horizontal movement of a load. This involves both movement of the boom and simultaneous movement of the load hoist. This procedure requires a high degree of skill on the part of the operator and it is often performed when moving loads across horizontal surfaces such as floors. Movement of loads horizontally is often required in liftcrane operation, but can be very difficult to do where it may be required to move the load out of sight of the liftcrane operator. Through appropriate programming and computation of trigonometric functions in the liftcrane operating routine, load level-luffing can be precisely and easily provided.

Still another example of a type of a subroutine that can be provided by the control system of the present invention is operation playback. With the addition of a means for data storage, the controller can provide that once an operator performs a certain operation or activity, regardless of how complicated it is, the operation can be recorded and "learned" by the routine on the CPU 28. Then the same activity can be played back by the operator and performed over and over again, thereby eliminating some of the tedium and difficulty of the operation.

In addition, another subroutine that can be added would be an area avoidance subroutine. Where the liftcrane is operating in a location near easily damaged items or hazardous materials such as electric lines or in a chemical plant, the liftcrane operator can provide information via the control panel indicating areas prohibited to the movement of the liftcrane. The liftcrane operating subroutine would then completely prevent any liftcrane movements that might impinge on the prohibited area thereby highly enhancing the safety of the liftcrane operation. This could be accomplished by having the liftcrane operator first move the crane to a boundary in one direction and indicate by the control panel that this is a first boundary, and then move the crane through non-prohibited area to a second boundary and indicate by the control panel that this is a second boundary. These boundary positions would be recorded by sensors and stored as data in the operating routine. Thereafter, during each cycle of the operating routine, the routine would check the crane movement against the boundaries of the prohibited area and refuse to execute any command that would cause the crane to encroach on the prohibited area.

Another subroutine can provide for use of a counterbalancing system. Such a counterbalancing system is described in copending U.S. application Ser. No. 07/269,222, entitled "Crane And Lift Enhancing Beam Attachment With Movable Counterweight", filed Nov. 9, 1988, U.S. Pat. No. 4,953,722 and incorporated herein by reference.

Another advantage of the present invention is that the operation and safety features of the liftcrane can easily be adapted for the different requirements of different countries. For example, in the Netherlands an exterior warning light must be provided when the liftcrane is in the free-fall mode. This can readily be provided by the routine by the addition of several lines of code (refer to Appendix I, lines 2000 to 2095).

The flexibility of the control system of this embodiment finds particular advantage when used in conjunction with the closed loop hydraulic system of this embodiment of the invention. Most liftcranes use an open loop system which have the inherent disadvantages, as mentioned above. This embodiment uses a closed loop hydraulic system operating under the programmable control system.

Figure 3:
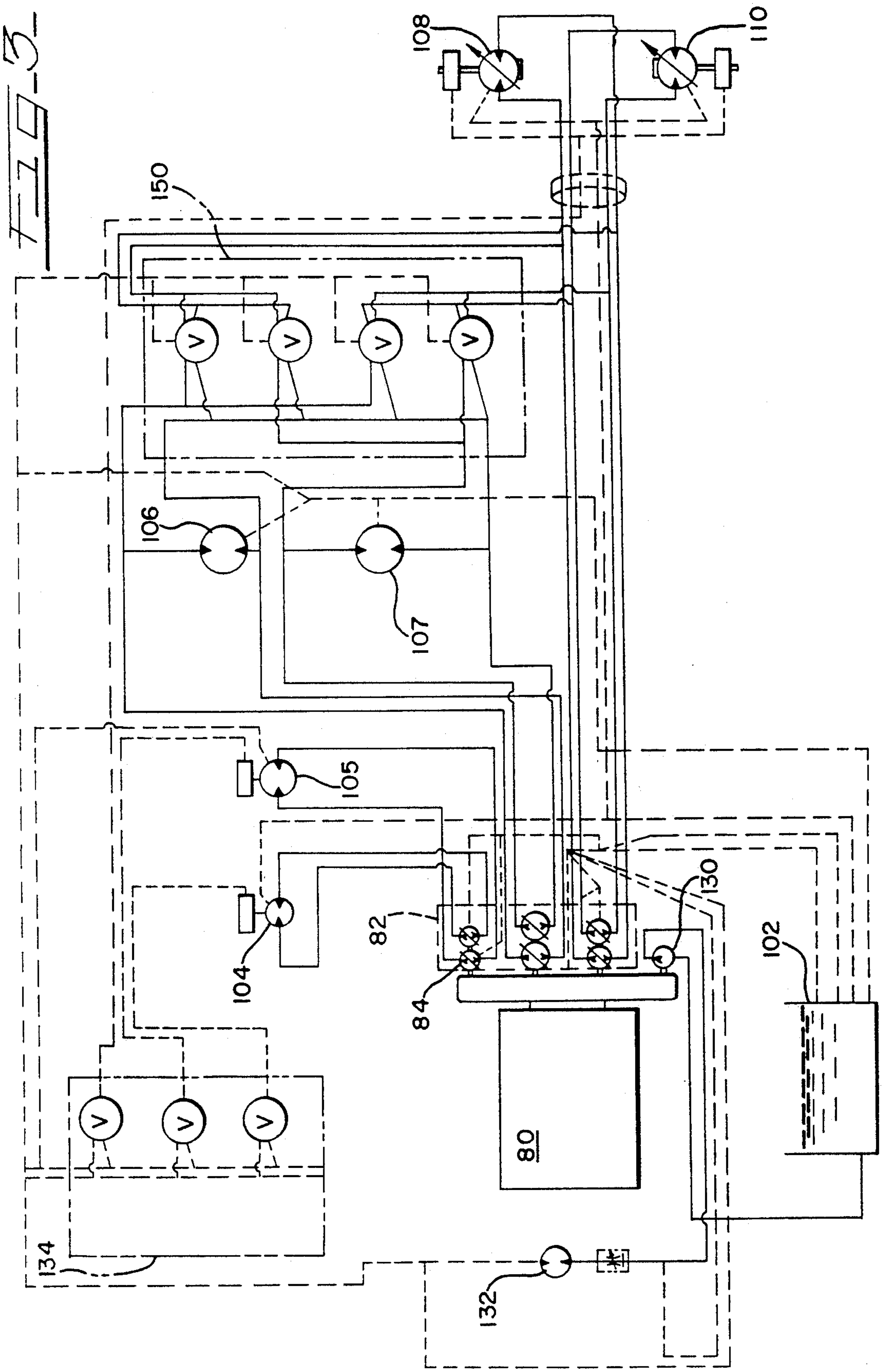
FIG. 3 is a diagram of a closed loop hydraulic system of an embodiment of the present invention.

Referring to FIG. 3, there is represented an engine 80 in this embodiment of the invention. The engine 80 can produce 210 horsepower. The engine size is chosen to be suitable for the size the liftcrane which in this case is rated at 50 tons. For different sizes of liftcranes, different sizes of engines would be used.

The engine 80 drives a plurality of main pumps 82. In this embodiment, there are six main pumps, each associated with one of the major mechanical subsystems of the liftcrane. Each of the pumps drives an actuator (motor) associated with its mechanical subsystem. Each of the six actuators is connected to its corresponding pump by a pair of hydraulic lines to form the closed loop. This enables application of hydraulic force to the actuators in either direction. A reservoir 102 is connected to the engine 80 outside of the closed loops between the pumps 82 and the six mechanical subsystems.

The actuators in the major mechanical subsystems include the following: A swing motor 104 controls the swing (movement of the upper works in relation to the lower works). A boom hoist motor 105 raises and lowers the boom. A rear hoist motor 106 controls the rear hoist drum and the front hoist motor 107 controls the front hoist drum. A left and right crawler motors 108 and 110 control the tractor crawlers, respectively. Additional mechanical subsystems may be powered either by use of an auxiliary pump, such as a fan pilot pressure pump 130, or by diverting flow from one or more of the main hydraulic pumps. This embodiment uses this former method to power the crawler extenders and gantry. These mechanical subsystems are connected to actuators associated with them by a solenoid valve 134.

One of the drawbacks normally associated with the multiple closed loop liftcrane system is the inability to bring a large percentage of the machine's pumping ability to bear on a single mechanical subsystem where high speed is required. This embodiment overcomes this drawback by means of the diverting valve assembly 150. The diverting valve assembly 150 operates to combine the closed loops of two or more pumps with a single actuator so that the operation of the mechanical subsystem associated with the actuator can take advantage of more than just the single pump normally associated with it. Consequently, the closed loop hydraulic system of the present invention is able to duplicate performance of an open loop system while also providing the advantages of the closed loop system.

In the present embodiment, the diverting valve assembly 150 provides the ability to direct a large percentage of the liftcrane's total pumping capacity to either the main or the whip hoist. The diverting valve assembly 150 also provides the ability to direct a substantial percentage of the liftcrane's total pumping capability to several of the auxiliary mechanical subsystems. The diverting valve assembly 150 also has the ability to combine several of the pumps to provide charge or pilot flow sufficient to operate large cylinders.

The ability to operate the diverting valve assembly 150 in the manner described is facilitated by this embodiment. The operation of the diverting valve assembly 150 to meet or exceed the levels of performance associated with an open loop system is provided by the routine described herein. As a result, the present embodiment can provide a high level of performance combined with economy and efficiency. Moreover, the present embodiment provides new features to augment an operator's skill and efficiency and also can provide a higher level of safety heretofore unavailable in liftcranes.

Figure 4:
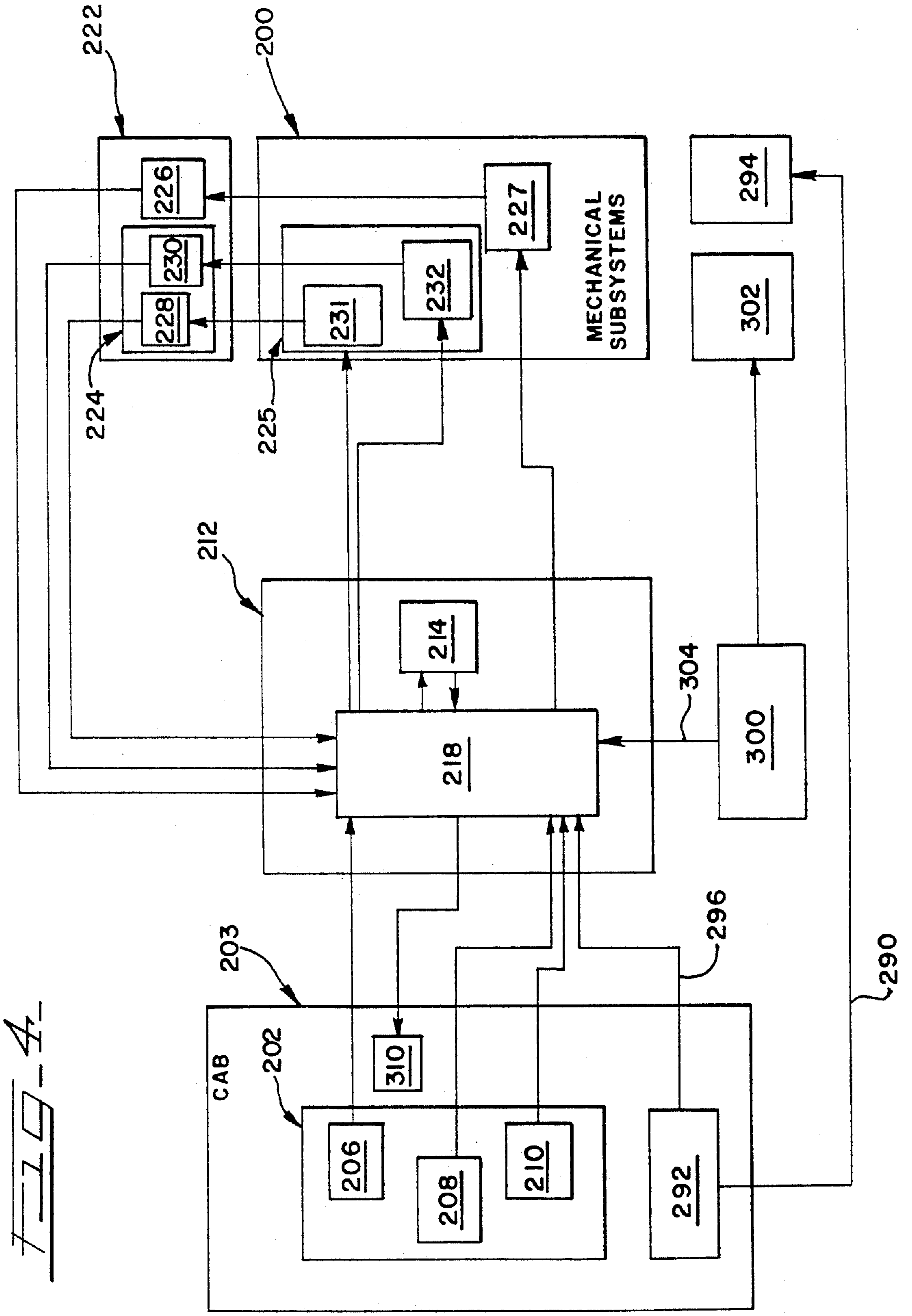
FIG. 4 is a schematic diagram of a control system for a second preferred embodiment of the present invention.

Referring to FIG. 4, there is depicted a schematic diagram of a control system for a second preferred embodiment of the present invention. In FIG. 4, a set of liftcrane mechanical subsystems 200 may be operated by a set of operator controls 202 located in an operator's cab 203. The set of operator controls 202 includes analog controls 206, digital controls 208, and mode selection controls 210. The set of operator controls 202 is connected to a programmable controller 212 which includes a CPU 214 capable of running an operating routine for the operation of the liftcrane mechanical systems. As in the previous embodiment, the analog controls 206 and the digital controls 208 (including the mode selection controls 210), respectively, are connected to an interface 218 to transfer information about the desired operation from the set 202 of operator controls to the CPU 214. As in the previous embodiment, sensors 222 associated with the set 200 of mechanical subsystems monitor the status thereof and provide information back to programmable controller 212. The sensors 222 include both analog sensors 224 that connect to the programmable controller 212 via the interface 218 to monitor a set 225 of mechanical subsystems, and limit switches 226 that connect to the programmable controller 212 via the interface 218 to monitor another set 227 of mechanical subsystems. In this embodiment, the analog sensors 224 include both pressure transducers 228 and position-speed sensors 230. The pressure transducers 228 and position-speed sensors 230 may be used to monitor separate sets 231 and 232, respectively, of mechanical subsystems or, for certain mechanical subsystems, the pressure transducers 228 and position-speed sensors 230 may be used in conjunction with a single mechanical subsystem to augment the control and performance thereof. (Thus, as used herein, mechanical subsystems monitored by pressure sensors and position-speed sensors need not necessarily be separate mechanical subsytems). Mechanical subsystems that may utilize both pressure sensors and position-speed sensors include the swing and each of the hoists.

The addition of pressure sensors in the second preferred embodiment allows for improved liftcrane operation over the previous embodiment in which only position-speed sensors are used. In particular, the second preferred embodiment provides for improved liftcrane operation by having the capability to combine, either simultaneously or alternately, both pressure control as well as position-speed control in performing certain functions. This is particularly useful for example for any liftcrane function in which two or more lines are used together. This would include functions such as clamshell, pile driving, tagline, magnet and grapple.

For example, in performing clamshell work in a prior liftcrane, the operator must support the load with one line and maintain slight tension on the other by the simultaneous control of two or more separate handles and two brake pedals in the cab. Smooth, efficient operation of a clamshell can be relatively difficult requiring a high degree of skill and coordination on the part of the operator. With this second preferred embodiment of the present invention, by using a pressure sensor on the pump connected to the hoist drum, the controller can, when required, command the pump to maintain a fixed, low tension (pressure) hoist on one line and then instantly revert to full power capability for the remainder of the clam operating cycle. Thus, operation is simplified.

With respect to the other functions, similar advantages obtain. For each, the simultaneous control of two separate mechanical subsystems in which one is operated in response to a pressure sensed allows for benefits associated with simplification of operation, increased safety, and greater efficiency. For example, with magnet work, a cable is maintained to steady the magnet. The operation of this steadying cable can be managed by the controller to maintain a fixed pressure to steady the magnet. Similarly, in pile driving operations, one of the lines can be put under pressure control while the other is operated to move the pile driver.

Figure 5:
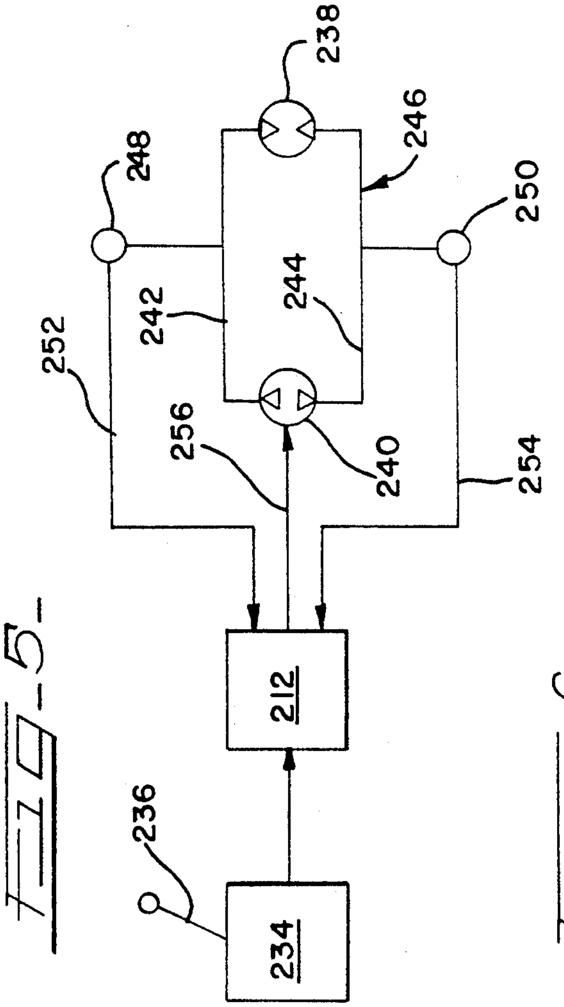
FIG. 5 is a schematic of a portion of the second preferred embodiment of the liftcrane control and hydraulic system relating to swing operation.

In the second preferred embodiment of the present invention, improved, smoother swing operation is provided by having pressure sensors that provide output signals to the programmable controller. In this embodiment of the invention, the pump associated with the swing can be operated to maintain a commanded pressure (i.e. "torque output"). This allows a standard displacement pump to be used as a free-coasting swing pump and provides for smoother operation of the swing. In FIG. 5, there is depicted a schematic of one embodiment of a portion of the liftcrane control and hydraulic system for the swing. A control handle 234 is located in the operator's cab. The control handle 234 includes a lever 236 movable across a range of positions. The control handle 234 is a part of the operator controls and accordingly the control handle 234 provides an output 235 to the programmable controller 212. A swing motor 238 is connected to the upper works and lower works (neither shown) to effect the relative movement therebetween. The swing motor 238 is driven by a pump 240 to which it is connected by first and second hydraulic lines 242 and 244 (i.e. a closed loop 246). Two pressure sensors are associated with the swing motor 238. These pressure sensors are preferably pressure transducers. A first pressure sensor 248 is connected to the first hydraulic line 242 and a second pressure sensor 250 is connected to the second hydraulic line 244. The first and second pressure sensors 248 and 250 are connected to the programmable controller 212 to provide feedback signals 252 and 254 thereto indicative of the pressure on each side of the closed loop 246 connected to the swing motor 238. The routine run on the programmable controller 212 compares these feedback signals with the signal 235 obtained from the control handle 234. The routine on the programmable controller then generates an output 256 to the pump 240 to modify the operation of the pump, if necessary to effect the desired operation of the swing. As a further advantage, this same pump can be operated instead with displacement-type operating characteristics. Selection of torque- or displacement-type operating characteristics can be made by the operator by means of a mode selection switch in the cab. When used with displacement-type operating characteristic, the feedback signals 252 and 254 are either not taken into account or factored down and the pump 240 is operated directly in response to the input signal 235 from the control handle 234. Although this operation of the swing in displacement mode does not provide for free coast, it may be more suitable for certain operations such as precise, small-displacement movements of the swing. Thus, the pump can be operated in either mode depending on what is most suitable for the task. The programmable controller 212 allows for the switching from torque control to displacement control at the touch of a button.

Figure 6:
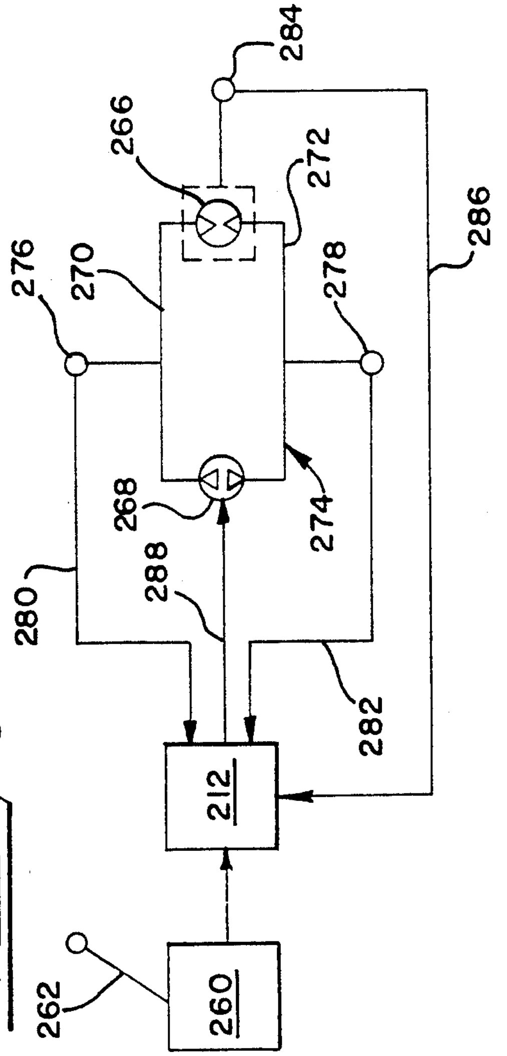
FIG. 6 is a schematic of a portion of the second preferred embodiment of the liftcrane control and hydraulic system relating to hoist operation.

Referring to FIG. 6, there is depicted a schematic of one embodiment of a portion of the liftcrane control and hydraulic system for the hoist. A control handle 260 is located in the operator's cab. The control handle 260 includes a lever 262 movable across an infinite range of positions. The control handle 260 is a part of the operator controls and accordingly the control handle 260 provides an output 264 to the programmable controller 212. A hoist motor 266 is connected to the hoist drum (not shown) to effect the operation thereof. The hoist motor 266 is driven by a pump 268 to which it is connected by first and second hydraulic lines 270 and 272 (i.e. a closed loop 274). Two pressure sensors are associated with the hoist motor 266. A first pressure sensor 276 is connected to the first hydraulic line 270 and a second pressure sensor 278 is connected to the second hydraulic line 272. The first and second pressure sensors 276 and 278 are connected to the programmable controller 212 to provide first and second pressure feedback signals 280 and 282 to the programmable controller 212 indicative of the pressure on each side of the closed loop 274 connected to the hoist motor 266. In addition, a position-speed sensor 284 is responsive the movement of the hoist. The position-speed sensor 284 is connected to the programmable controller 212 to provide a feedback signal 286 thereto, indicative of the movement or position of the hoist. The routine on the programmable controller 212 compares the three feedback signals 280, 282, 286 and the signal 264 obtained from the control handle 260. The routine then generates an output 288 to the pump 268 to modify the operation of the pump, if necessary, to effect the desired operation of the hoist.

With this embodiment of the present invention, the programmable controller 212 can operate the hoist to synchronize brake release and pump displacement at the onset of a hoist or a lower command. This enables clam operation, for instance, to be performed with a "single stick".

The versatility of this control system is demonstrated by the following example. One commonly performed liftcrane operation involves lifting a load with the boom and moving it to another location. This involves the steps of lowering the hoist to engage the load, lifting the load by tensioning the hoist, applying a brake to the hoist to fix the load at the height at which it has been raised, moving the load to the desired location by operation of the swing and/or the boom, releasing the brake and then lowering the load. In closed loop hoist systems when the brake is released prior to lowering the load, the load can slip or shift until sufficient pressure is induced into the hoist motor to exactly compensate for the weight of the load. This slipping or shifting can be an undesirable operating characteristic. This undesirable operating characteristic can be eliminated by this embodiment of the present invention. The liftcrane operating routine run on the controller includes the following steps: The operator in the cab manipulates the controls to hoist the load and set the brake. Operation of the appropriate controls by the operator sends signals from the controls to the programmable controller. The operation of the mechanical subsystems related to the hoist and brake are under the control of the programmable controller that carries out these operations. Upon sensing the engagement of the hoist brake, data is stored in memory indicative of a reading of the pressure sensors 276 and 278 connected to the hoist drum motor 266 at the time when the brake is engaged. This data reading is stored while the brake is engaged including during the time when the brake is engaged and the load is being moved laterally by the swing or by movement of the boom. During the period of time when the brake is engaged and the load is being moved, the pressure previously applied to the hoist motor 266 dissipates. However, when the operator operates the controls to signal to the programmable controller to release the brake, before the brake is actually released, the pressure reading stored in memory is compared to the pressure reading sensed at the hoist motor 266 by the operating routine on the programmable controller. If the pressure reading at the hoist is not equal to the reading stored in memory, the programmable controller, following the operating rountine, commands pressure to be applied to the hoist motor 266 to duplicate the pressure that was applied thereto immediately at the time the brake was engaged. When the pressure at the hoist motor 266 is sensed to be equal to the value in memory, the brake is disengaged. In this manner, unless the load changes during movement, there should be no slipping or shifting of the load when the brake is released. If the load has changed and the memory setting is too high, the position-speed sensor will detect any misdirection and the routine will operate the pump as soom as the brake is released to correct it.

Referring again to FIG. 4, the second preferred embodiment also includes a direct connection 290 between a set 292 of operator controls and a set 294 of mechanical subsystems to enable this set of mechanical subsystems to be operated directly by the operator controls 292 instead of being operated through the programmable controller 212. The mechanical subsystems which may be operated outside the control of the programmable controller include the boom pawl and the right and left and front and rear diverting valves. These mechanical subsystems are operated directly instead of through the programmable controller because their operation is not considered to be specifically enhanced or benefitted by computer control. The selection of mechanical subsystems operated directly may be made depending upon considerations associated with the specific use of the liftcrane. Although operation of this set 292 of mechanical subsystems is not under the programmable controller 212, switches associated with their operation may be connected to the programmable computer 212 to provide an output 296 thereto in order to provide an indication of the operation of one or more of this set 292 of mechanical subsystems.

In this second preferred embodiment of the present invention, a remote control panel 300 is also included. The remote control panel 300 is connected to the liftcrane by a tether cable (not shown) so that certain of the mechanical subsystems of the liftcrane can be controlled remotely, e.g. by an operator standing outside of the cab. Preferably the tether is disconnectable from the liftcrane so that the remote control panel 300 can be removed when not in use, if desired. In this second preferred embodiment, the remote control panel 300 may be used to operate certain mechanical subsystems through the programmable controller 212 and also operate certain other functions directly. Accordingly, the remote control panel 300 is connected both to the programmable controller 212 by a line 304 as well as to a set 302 of mechanical subsystems. In this embodiment, the mechanical subsystems that can be controlled directly by the remote control panel include the crawler extension, part of the gantry raising system, and the counterweight pins. The mechanical subsystems controlled by the remote control panel through the programmable controller include the boom hoist, movable counterweight and carrier and the movable counterweight beam, as disclosed in the aforementioned copending application, Ser. No. 07/269,222, U.S. Pat. No. 4,953,722 incorporated herein by reference. The selection of which mechanical subsystems are operated by the remote control panel through the programmable controller depends on the specific design of the liftcrane manufacturer with a consideration of the purposes for which the liftcrane will used.

The second preferred embodiment also includes an operator's display system connected to the programmable controller. An operator's display 310 is positioned in the cab 203 and conveys to the operator information about the status of the liftcrane mechanical subsystems. The display 310 can be a monitor of the CRT or LCD type, or the like, selected for heavy duty use. The display 310 is capable of presenting information from any of the sensors or operator controls 202 which are connected to the programmable controller 212. For example, the display 212 can show to the operator air pressure, charge pressure, engine oil pressure, main hydraulic system pressure, fuel level, battery voltage, engine water temperature, engine speed, hoist drum speed, etc.

Figure 7:
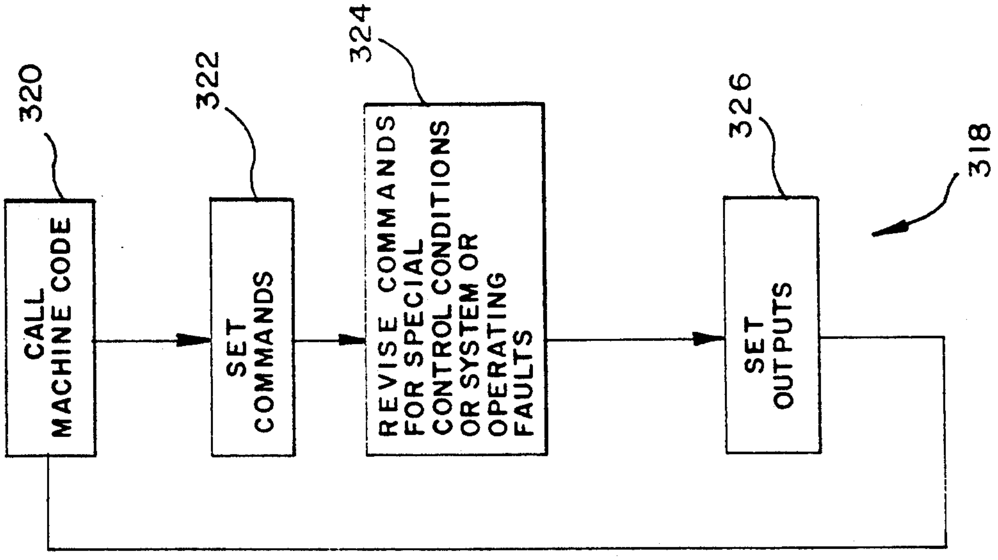
FIG. 7 is a flow chart of the routine that may be run on the programmable controller of the second preferred embodiment of the present invention of FIG. 4.

Referring to FIG. 7, there is depicted a flow chart of the routine 318 that may be run on the programmable controller 212 of the second preferred embodiment of the present invention. The routine 318 is similar to the routine 48 of the previous embodiment. Like the previous routine, the routine 318 of the second embodiment includes sections of code for reading the data from the operator controls 202 and the sensors 222 and outputting commands for the mechanical systems 200. The routine of the second embodiment includes a CALL MACHINE subroutine 320 that calls the SET COMMANDS section 322 which in turn calls the REVISE COMMANDS section 324 that in turn calls a SET OUTPUTS section 326. The SET OUTPUTS section 326 returns control to the CALL MACHINE section 320 so that the routine operates in a loop and runs each of these sections in each cycle of the loop. In this preferred embodiment, the CALL MACHINE subroutine is written in Basic and the other three sections are written in machine code. A copy of the routine of the second embodiment is included in Appendix II.

It is intended that the detailed description herein be regarded as illustrative rather than limiting, and that it be understood that it is the claims, including all equivalents, which are intended to define the scope of the invention.

APPENDIX I

```
1 REM M-SERIES MACHINE PROGRAM. DUTCH STANDARD. ver. 1.0 9/24/89
2 REM COPYRIGHT (C) 1989 AN UNPUBLISHED WORK
3 REM BY THE MANITOWOC CO. INC.  ALL RIGHTS RESERVED
10 CLOCK1:CLEAR
18 XBY(0C003H)=9BH
19 REM ONERR 10
20 K1=245:K2=5:K3=145:K4=100:DB1=30:DB2=25:K6=235:U=1
31 XBY(0F100H)=255:XBY(0F110H)=225:XBY(0F200H)=255:XBY(0F210H)=255
32 XBY(0F400H)=255:XBY(0F410H)=255
41 P1=5:P2=5:P3=5:P4=0
45 XBY(0F120H)=P1:XBY(0F220H)=P2:XBY(0F420H)=P3:XBY(0F820H)=0
49 P2=P2.OR.80H:P4=P4.OR.191
50 XBY(0F820H)=P4:XBY(0F220H)=P2
55 FOR DD=1 TO 1000:NEXT DD:GOSUB 1300:GOSUB 1200
REM DIRECTOR
165 FOR I=1 TO 30
170 N1=XBY(0F015H)-119:N2=XBY(0F014H)-119:N3=XBY(0F013H)-119
175 N5=XBY(0F011H)-119:N6=XBY(0F010H)-119
200 IF F3 THEN GOSUB 950
219 GOSUB 600
218 IF ABS(N2)>DB1.OR.H2=1 THEN GOSUB 500
220 IF ABS(N1)>DB1.OR.H1=1 THEN GOSUB 450
222 IF ABS(N3)>DB1.OR.H3=1 THEN GOSUB 550
230 IF ABS(N5)>DB1.OR.H5=1 THEN GOSUB 650
234 IF ABS(N6)>DB1.OR.H6=1 THEN GOSUB 700
236 NEXT I
238 IF(H1.OR.H2.OR.H3.OR.H5.OR.H6.OR.Y6.OR.Y7) THEN 165
240 GOSUB 1200:GOSUB 1300:GOTO 165
REM FRONT HOIST DRUM SUBROUTINE
450 IF XBY(6000H)<29 THEN A6=0
452 IF (Q1-A6)=1 THEN D1=1 ELSE D1=0
454 Q1=A6:A6=A6.OR.D1
456 X4=SGN(XBY(0C001H).AND.20H):X6=SGN(XBY(0C001H).AND.80H)
458 F5=SGN(XBY(0C000H).AND.10H):F8=SGN(XBY(0C001H).AND.01H)
460 IF (N1>DB1).AND.(N1<126) THEN A3=1 ELSE A3=0
462 IF (N1<-DB1).AND.(N1>-118) THEN A2=1 ELSE A2=0
464 Z1=X6.OR.F8.OR.A3
466 S1=(F5.OR.A2).AND.A6.AND.F6.AND.(X4.OR.F8.OR.A2).AND.Z1
468 IF X0 THEN N5=N1:S5=S1
470 IF X2 THEN N6=N1:S6=S1
472 IF S1 THEN P4=P4.OR.04H ELSE P4=P4.AND.251
473 GOSUB 600
```

```
474 IF A2 THEN P1=P1.OR.10H ELSE P1=P1.AND.239
476 XBY(0F120H)=P1:XBY(0F820H)=P4
478 IF M3 THEN 1400
480 IF M2 THEN 1600
482 IF XBY(6006H)>182 THEN A4=1 ELSE A4=0
484 M8=(A4.AND.A3.OR.A2).AND.S1:P4=P4.AND.191:XBY(0F820H)=P4
490 IF M8 THEN P3=P3.OR.80H ELSE P3=P3.AND.127
492 XBY(0F420H)=P3
493 XBY(0F100H)=255-((K2*A3)+((ABS(N1)-DB1)/95)*K1)*S1*(A3.OR.A2)
496 H1=1:IF (A3.OR.A2)=0 THEN H1=0
498 RETURN
REM REAR HOIST DRUM SUBROUTINE
500 IF XBY(6001H)<29 THEN A7=0
502 IF (Q2-A7)=1 THEN D2=1 ELSE D2=0
504 Q2=A7:A7=A7.OR.D2
506 X5=SGN(XBY(0C001H).AND.40H):X7=SGN(XBY(0C002H).AND.1H)
508 F5=SGN(XBY(0C000H).AND.10H):F8=SGN(XBY(0C001H).AND.01H)
510 IF (N2>DB1).AND.(N2<126) THEN A1=1 ELSE A1=0
512 IF (N2<-DB1).AND.(N2>-118) THEN A0=1 ELSE A0=0
514 Z2=X7.OR.F8.OR.A1
516 S2=(F5.OR.A0).AND.A7.AND.F6.AND.(X5.OR.F8.OR.A0).AND.Z2
518 IF X1 THEN N5=N2:S5=S2
520 IF X3 THEN N6=N2:S6=S2
522 IF S2 THEN P4=P4.OR.02H ELSE P4=P4.AND.253
523 GOSUB 600
524 IF A0 THEN P1=P1.OR.20H ELSE P1=P1.AND.223
526 XBY(0F120H)=P1:XBY(0F820H)=P4
528 IF M3 THEN 1500
530 IF M2 THEN 1700
532 IF XBY(6007H)>182 THEN A5=1 ELSE A5=0
534 S2=(1-H1).AND.S2
536 M9=(A5.AND.A1.OR.A0).AND.S2
538 IF M9 THEN P3=P3.OR.20H ELSE P3=P3.AND.223
540 XBY(0F420H)=P3
542 XBY(0F110H)=255-((K2*A1)+((ABS(N2)-DB1)/95)*K1)*S2*(A1.OR.A0)
546 H2=1:IF (A1.OR.A0)=0 THEN H2=0
548 RETURN
REM BOOM HOIST DRUM SUBROUTINE
550 IF XBY(6003H)<29 THEN A8=0
551 IF (Q3-A8)=1 THEN D3=1 ELSE D3=0
552 Q3=A8:A8=A8.OR.D3
553 F5=SGN(XBY(0C000H).AND.10H):F8=SGN(XBY(0C001H).AND.01H)
555 X8=SGN(XBY(0C002H).AND.02H):X9=SGN(XBY(0C002H).AND.04H)
560 F9=SGN(XBY(0C000H).AND.80H)
561 IF (N3>DB1).AND.(N3<126) THEN Y9=1 ELSE Y9=0
562 IF (N3<-DB1).AND.(N3>-118) THEN Y8=1 ELSE Y8=0
568 IF Y9 THEN P1=P1.OR.40H ELSE P1=P1.AND.191
569 XBY(0F120H)=P1
570 S3=(Y9.AND.(X8.OR.F9).OR.Y8.AND.(X9.OR.F8).AND.F5).AND.A8.AND.F6
571 GOSUB 600
573 R0=Y8.AND.S3
575 IF S3 THEN P4=P4.OR.01H ELSE P4=P4.AND.254
579 IF R0 THEN P3=P3.OR.10H ELSE P3=P3.AND.239
580 XBY(0F820H)=P4:XBY(0F420H)=P3
585 XBY(0F200H)=255-((K2*Y9)+((ABS(N3)-DB1)/70)*K6)*S3
595 H3=1:IF (Y9.OR.Y8)=0 THEN H3=0
596 RETURN
REM SWING SUBROUTINE
600 IF XBY(6002H)<26 THEN A9=0:GOSUB 1800
602 N4=XBY(0F012H)-119
604 IF (N4>DB2).AND.(N4<126) THEN Y7=1 ELSE Y7=0
605 IF (N4<-DB2).AND.(N4>-118) THEN Y6=1 ELSE Y6=0
618 IF Y6 THEN P1=P1.OR.80H ELSE P1=P1.AND.127
620 XBY(0F120H)=P1
635 XBY(0F210H)=255-(K4+((ABS(N4)-DB2)/45)*K3)*S4*(Y7.OR.Y6)
646 RETURN
REM RIGHT TRACK SUBROUTINE
650 IF XBY(6004H)<26 THEN M0=0:GOSUB 1900
```

```
653 IF (N5>DB1).AND.(N5<126) THEN Y5=1 ELSE Y5=0
654 IF (N5<-DB1).AND.(N5>-118) THEN Y4=1 ELSE Y4=0
668 IF Y4 THEN P2=P2.OR.10H ELSE P2=P2.AND.239
669 XBY(0F220H)=P2:GOSUB 600
670 R2=S5.AND.(Y2.OR.Y3.OR.Y4.OR.Y5).AND.(1-M4)
679 IF R2 THEN P2=P2.OR.40H ELSE P2=P2.AND.191
680 XBY(0F220H)=P2
685 XBY(0F400H)=255-(K2+((ABS(N5)-DB1)/95)*K1)*S5*(Y4.OR.Y5)
695 H5=1:IF (Y5.OR.Y4)=0 THEN H5=0
696 RETURN
REM LEFT TRACK SUBROUTINE
700 IF XBY(6005H)<26 THEN M1=0:GOSUB 1900
703 IF (N6>DB1).AND.(N6<126) THEN Y3=1 ELSE Y3=0
704 IF (N6<-DB1).AND.(N6>-118) THEN Y2=1 ELSE Y2=0
718 IF Y2 THEN P2=P2.OR.20H ELSE P2=P2.AND.223
719 XBY(0F220H)=P2:GOSUB 600
720 R2=S6.AND.(Y2.OR.Y3.OR.Y4.OR.Y5).AND.(1-M4)
729 IF R2 THEN P2=P2.OR.40H ELSE P2=P2.AND.191
730 XBY(0F220H)=P2
735 XBY(0F410H)=255-(K2+((ABS(N6)-DB1)/95)*K1)*S6*(Y2.OR.Y3)
745 H6=1:IF (Y3.OR.Y2)=0 THEN H6=0
748 RETURN
REM COUNTERWEIGHT HANDLING SUBROUTINE
950 Y0=SGN(XBY(0C002H).AND.8H):Y1=SGN(XBY(0C002H).AND.10H)
960 IF Y1=1 THEN N3=50
965 IF Y0=1 THEN N3=-50
998 RETURN
REM CHARGE PRESSURE RESET/OUT OF RANGE SUBROUTINE
1200 R4=A6.AND.A7.AND.A8.AND.A9.AND.M0.AND.M1
1201 IF R4=0 THEN P4=P4.OR.20H ELSE P4=P4.AND.223
1202 XBY(0F820H)=P4
1205 IF XBY(6002H)>30 THEN A9=1:GOSUB 1800
1207 IF XBY(6003H)>30 THEN A8=1
1210 IF XBY(6004H)>30 THEN M0=1:GOSUB 1900
1215 IF XBY(6005H)>30 THEN M1=1:GOSUB 1900
1220 IF XBY(6000H)>30 THEN A6=1
1225 IF XBY(6001H)>30 THEN A7=1
1230 IF XBY(6000H)>110 THEN A6=0
1235 IF XBY(6001H)>110 THEN A7=0
1240 IF XBY(6003H)>110 THEN A8=0
1245 IF XBY(6002H)>110 THEN A9=0
1250 IF XBY(6004H)>110 THEN M0=0
1255 IF XBY(6005H)>110 THEN M1=0
1260 R4=A6.AND.A7.AND.A8.AND.A9.AND.M0.AND.M1
1265 IF R4=0 THEN P4=P4.OR.20H ELSE P4=P4.AND.223
1270 XBY(0F820H)=P4
1295 RETURN
REM OPERATING MODE SUBROUTINE
1300 F1=SGN(XBY(0C000H).AND.1H):F2=SGN(XBY(0C000H).AND.2H)
1306 F3=SGN(XBY(0C000H).AND.4H):F7=SGN(XBY(0C000H).AND.40H)
1308 X0=SGN(XBY(0C001H).AND.2H):X1=SGN(XBY(0C001H).AND.4H)
1310 X2=SGN(XBY(0C001H).AND.8H):X3=SGN(XBY(0C001H).AND.10H)
1312 F6=SGN(XBY(0C000H).AND.20H):F6=F6.AND.(1-F3)
1314 M2=F1.AND.F7:M4=X0.OR.X1.OR.X2.OR.X3
1316 M3=F2.AND.F7
1319 IF (F1.OR.F2.OR.F7) THEN P4=P4.OR.80H ELSE P4=P4.AND.127
1320 XBY(0F820H)=P4
1350 IF ((F1.OR.F2)-F7)<>0 THEN GOSUB 2000:GOTO 1300
1360 IF M2=1 THEN P3=P3.OR.224:P4=P4.OR.64
1365 IF M3=1 THEN P3=P3.OR.160
1370 XBY(0F420H)=P3:XBY(0F820H)=P4
1395 RETURN
REM FRONT HOIST DRUM - CLAMSHELL MODE ROUTINE
1400 AZ=(A0.OR.A1.OR.A2.OR.A3)
1420 XBY(0F100H)=255-((K2*A3)+((ABS(N1)-DB1)/95)*K1*L1)*(AZ)*S1
1495 GOTO 496
REM REAR HOIST DRUM - CLAMSHELL MODE ROUTINE
1500 N1=N1+N2:IF N1>120 THEN N1=120
```

```
1505 IF ABS(N1)<DB1 THEN N1=DB1
1510 L=(128-XBY(0F016H))/400
1515 IF L>0 THEN L1=1-L:L2=1 ELSE L1=1:L2=1+L
1520 XBY(0F110H)=255-((K2*A1)+((ABS(N2)-DB1)/95)*K1*L2)*(A1.OR.A0)*S2
1595 GOTO 546
REM FRONT HOIST DRUM - FREE FALL MODE ROUTINE
1600 IF (A2.OR.A3)=0 THEN P4=P4.OR.40H ELSE P4=P4.AND.191
1605 XBY(0F820H)=P4
1695 GOTO 493
REM REAR HOIST DRUM - FREE FALL MODE ROUTINE
1700 IF (A1.OR.A0)=0 THEN P3=P3.OR.40H ELSE P3=P3.AND.191
1705 XBY(0F420H)=P3
1795 GOTO 542
REM SWING SUPPLY RELAY AND BRAKE SUBROUTINE
1800 S4=F6.AND.A9:R1=S4
1810 IF S4 THEN P4=P4.OR.08H ELSE P4=P4.AND.247
1820 IF R1 THEN P2=P2.OR.80H ELSE P2=P2.AND.127
1850 XBY(0F220H)=P2:XBY(0F820H)=P4
1895 RETURN
REM TRACK SUPPLY RELAY SUBROUTINE
1900 S5=M0:S6=M1
1910 IF (S5.AND.S6) THEN P4=P4.OR.10H ELSE P4=P4.AND.239
1920 XBY(0F820H)=P4
1995 RETURN
REM F-FALL WARNING LIGHT SUBROUTINE
2000 P3=P3.AND.31:P4=P4.AND.63
2007 XBY(0F420H)=P3:XBY(0F820H)=P4
2010 FOR EE=1 TO 100:NEXT EE
2095 RETURN
```

APPENDIX II

```
1 REM M-SERIES MACHINE PROGRAM. CALL PROGRAM CP004  07/02/90
2 REM ROUTINE TO INITIALIZE AND CALL COMPILED SUBROUTINE
3 REM COMMAND PPI CONFIGURATION FOR ACC., DIG/ANAL. AND PCPA BOARDS
4 REM COPYRIGHT (C) 1990 AN UNPUBLISHED WORK
5 REM BY THE MANITOWOC CO. INC.  ALL RIGHTS RESERVED
6 XBY(0F013H)=8BH:XBY(0F113H)=9BH:XBY(0C003H)=9BH
7 REM LIMIT TOP OF BASIC MEMORY USAGE TO LOCATION 1EFFH
8 MTOP=1EFFH
10 REM INITIALIZE OUTPUT PORTS AND TEST WARNING LAMPS
11 XBY(0F100H)=128:XBY(0F101H)=128:XBY(0F200H)=128:XBY(0F201H)=128
12 XBY(0F300H)=128:XBY(0F301H)=128
13 XBY(0F110H)=21H:XBY(0F210H)=81H:XBY(0F310H)=01H
17 FOR I=1 TO 1000:NEXT I
20 REM SET PROGRAM CONSTANTS
21 XBY(1F3AH)=60:XBY(1F3BH)=8:XBY(1F3CH)=30:XBY(1F3DH)=120
22 XBY(1F3EH)=4:XBY(1F3FH)=150:XBY(1F40H)=100:XBY(1F41H)=3
23 XBY(1F42H)=70:XBY(1F43H)=4:XBY(1F44H)=150:XBY(1F45H)=3
25 XBY(1F7FH)=1:XBY(1F80H)=40
27 XBY(1F9BH)=10H:XBY(1F9CH)=0H
30 REM INITIALIZE PRESSURE MEMORY
35 XBY(1FA1H)=38:XBY(1FA2H)=38
49 REM INITIALIZE ON-OFF OUTPUT VARIABLES
50 XBY(1F00H)=01H:XBY(1F01H)=01H:XBY(1F02H)=01H
99 REM CALL COMPILED CODE
100 CALL 09800H
200 GOTO 100
/*COPYRIGHT (C) 1990 AN UNPUBLISHED WORK
  BY THE MANITOWOC CO. INC.  ALL RIGHTS RESERVED */

$PAGEWIDTH(78)
$DEBUG
$ROM(LARGE)
$REGISTERBANK(3)
```

```
M: DO;
/*  INTERFACE BASIC TO PLM PROGRAM
 PUSH PSW          CO,DO        SAVE PSW ON BASIC STACK
 MOVE PSH,018H     75,DO,18     USE OWN PSW FOR REG BANK=3
 LCALL 9900        12,99,00     CALL PROGRAM AT 9900
 POP   PSW         DO,DO        RESTORE BASIC PSW
 RET               22           RETURN TO BASIC       */
DECLARE STARTER(11) BYTE CONSTANT
 (0C0H,0D0H,075H,0D0H,018H,012H,099H,000H,0D0H,0D0H,022H);
/*
  M-SERIES MACHINE PROGRAM. DUTCH STANDARD. CP004 07/02/90*/
/*FOR SUNDSTRAND SGL. AXIS HANDLES ON ALL FUNCTIONS*/
/*WITH PRESSURE MEMORY HOIST THRESHOLD CONTROL*/
/*WITH DTH SET TO 0*/
/*WITH OFFSET SET TO 0*/
/*WITH ROUTINE TO SUPPRESS OVERSHOOT*/
/*DECLARE BIT DIGITAL INPUTS. MAKE BIT ADRESSABLE*/
DECLARE DCL LITERALLY 'DECLARE';
DECLARE AUX LITERALLY 'AUXILIARY';
DECLARE TRUE  LITERALLY '0FFH';
DECLARE FALSE LITERALLY '00H';
DCL I1 STRUCTURE ((B1,B2,B3,B4,B5,B6,B7,B8) BIT);
DCL I2 STRUCTURE ((B1,B2,B3,B4,B5,B6,B7,B8) BIT);
DCL BASIC22 STRUCTURE ((B1,B2,B3,B4,B5,B6,B7,B8) BIT);
DCL BASIC23 STRUCTURE ((B1,B2,B3,B4,B5,B6,B7,B8) BIT);
DCL BASIC24 STRUCTURE ((B1,B2,B3,B4,B5,B6,B7,B8) BIT);
DCL BASIC25 STRUCTURE ((B1,B2,B3,B4,B5,B6,B7,B8) BIT);
DCL BASIC26 STRUCTURE ((B1,B2,B3,B4,B5,B6,B7,B8) BIT);
DCL BASIC27 STRUCTURE ((B1,B2,B3,B4,B5,B6,B7,B8) BIT);
DCL BASIC28 BYTE AT (.BASIC27+1);
DCL BASIC29 BYTE AT (.BASIC27+2);
DCL BASIC2A BYTE AT (.BASIC27+3);
DCL I3 STRUCTURE ((B1,B2,B3,B4,B5,B6,B7,B8) BIT);
DCL IB1 BYTE AT (.I1);
DCL IB2 BYTE AT (.I2);
DCL IB3 BYTE AT (.I3);
DCL IB4 BYTE AT (0C000H) AUX;
DCL IB5 BYTE AT (0C001H) AUX;
DCL IB6 BYTE AT (0C002H) AUX;
/*
   DECLARE ON-OFF OUTPUTS*/
DCL OB4 BYTE AT (0F110H) AUX;
DCL OB5 BYTE AT (0F210H) AUX;
DCL OB6 BYTE AT (0F310H) AUX;
/*
  DECLARE ANALOG INPUTS*/
DCL UTACH2 BYTE AT (0F017H) AUX;
DCL DTACH2 BYTE AT (0F016H) AUX;
DCL H1 BYTE AT (0F015H) AUX;
DCL H2 BYTE AT (0F014H) AUX;
DCL H3 BYTE AT (0F013H) AUX;
DCL H4 BYTE AT (0F012H) AUX;
DCL H5 BYTE AT (0F011H) AUX;
DCL H6 BYTE AT (0F010H) AUX;
DCL PSYS1 BYTE AT (6000H) AUX;
DCL PSYS2 BYTE AT (6001H) AUX;
DCL PSYS3 BYTE AT (6003H) AUX;
DCL CPH BYTE AT (6002H) AUX;
DCL CP5 BYTE AT (6004H) AUX;
DCL CP6 BYTE AT (6005H) AUX;
DCL UTACH1 BYTE AT (6007H) AUX;
DCL DTACH1 BYTE AT (6006H) AUX;
/*DCL ANALOG OUTPUTS*/
DCL PC1 BYTE AT (0F200H) AUX;
DCL PC2 BYTE AT (0F100H) AUX;
DCL PC3 BYTE AT (0F101H) AUX;
DCL PC4 BYTE AT (0F201H) AUX;
DCL PC5 BYTE AT (0F300H) AUX;
```

```
DCL PC6 BYTE AT (0F301H) AUX;
/*DECLARE PROGRAM VARIABLES AND CONSTANTS*/
DCL (OB1,OB2,OB3) BYTE AUX;
DCL (JA,JB,JC,J1,J2,J3,J4,J5,J6,J11,J12,J13,J61) BYTE AUX;
DCL (J62) BYTE AUX;
DCL (U1,U2,U3,D1,D2,D3,RT,LT,FR,RR,FL,RL) BYTE AUX;
DCL (SPF1,SPF2,SPF3,CPFH,CPF5,CPF6) BYTE AUX;
DCL (STF1,STF2,STF3,CTFH,CTF5,CTF6) BYTE AUX;
DCL (HPF1,HPF2,HPF3,HPF4,HPF5,HPF6) BYTE AUX;
DCL (OLF1,OLF2,OLF3,OLF4,OLF5,OLF6) BYTE AUX;
DCL (MDF1,MDF2) BYTE AUX;
DCL (GR,GS,GT) BYTE AUX;
DCL (GA,GB,GC,GD,GE,GF,GG,GH,GI,GJ,GK,GL) BYTE AUX;
DCL (DISP1,DISP2,DISP3,PCOM4,DISP5,DISP6) WORD AUX;
DCL (ULC1,ULC2,DLC1,DLC2,DLC3,CC1,CC2) WORD AUX;
DCL (CMD1,CMD2,CMD3,CMD4,CMD5,CMD6) WORD AUX;
DCL (FFL,CLM) BYTE AUX;
DCL (SPAN1,SPAN2,ON1,ON2) BYTE AUX;
DCL (J21,J22) WORD AUX;
DCL (J31,J32,J41,J42,J51,J52,J53,JD,JE,GV,GY) BYTE AUX;
DCL (PCHG1,PCHG2,PMEM3,J73,CPA,DTH1,DTH2,DTH3,GM,GN,GQ,GP,GX,GZ) WORD
AUX;
DCL (CPMH,CP15,CP16) WORD AUX;
DCL (PMEM1,PMEM2,LSTP1,LSTP2,JF,JH,BR1,BR2,BR3) BYTE AUX;
DCL (SAVE_BASIC28,SAVE_BASIC29,SAVE_BASIC2A) BYTE AUX;
$EJECT
/* SAVE BASIC BYTES IN BIT SPACE FOR RESTORE ON RETURN */
SAVE_BASIC28=BASIC28;
SAVE_BASIC29=BASIC29;
SAVE_BASIC2A=BASIC2A;
/*SET OUTPUT COMMANDS*/
/*READ DIGITAL INPUT BYTES*/
IB1=IB4;
IB2=IB5;
IB3=IB6;
/*OPERATING MODE FLAGS*/
IF (I1.B1 AND I1.B7 AND I1.B4) THEN FFL=TRUE;
IF (I1.B2 AND I1.B7 AND I1.B4) THEN CLM=TRUE;
IF (I1.B1 AND I1.B7)=0B THEN FFL=FALSE;
IF (I1.B2 AND I1.B7)=0B THEN CLM=FALSE;
/*FRONT, REAR AND BOOM HOIST THRESHOLDS*/
CPMH=CPH;
CP15=CP5;
CP16=CP6;
CPA=((CPMH+CP15+CP16)/3);
IF CPA>85 THEN CPA=85;
IF CPA<65 THEN CPA=65;
IF PMEM1<32 THEN PMEM1=32;
IF PMEM2<32 THEN PMEM2=32;
IF PMEM3<32 THEN PMEM3=32;
IF PMEM3>150 THEN PMEM3=32;
IF PMEM1>95 THEN PMEM1=95;
IF PMEM2>95 THEN PMEM2=95;
IF PMEM3>100 THEN PMEM3=100;
IF J73<32 THEN J73=32;
CPA=CPA-42;
GQ=1200;
GP=1200;
IF (I2.B2 OR I2.B4)=TRUE THEN GQ=1000;
IF (I2.B3 OR I2.B5)=TRUE THEN GP=1000;
IF (I2.B2 AND I2.B4)=TRUE THEN GQ=800;
IF (I2.B3 AND I2.B5)=TRUE THEN GP=800;
DTH1=((GQ/CPA)*PMEM1)+1600;
DTH2=((GP/CPA)*PMEM2)+1600;
DTH3=((600/CPA)*PMEM3);
DTH1=0;
DTH2=0;
DTH3=0;
```

```
/*FRONT, REAR AND BOOM HOIST LOAD CORRECTION FACTORS*/
GR=(PMEM1/32)*4;
GS=(PMEM2/32)*4;
GT=(PMEM3/32)*6;
GR=0;
GS=0;
GT=0;
IF U1=TRUE
   THEN DO;
   J41=0;
   DLC1=DTH1;
   ULC1=ULC1+(DTACH1*GJ);
   IF UTACH1>2 THEN BR1=TRUE;
   IF PSYS1>=PMEM1 THEN BR1=TRUE;
   IF BR1=TRUE THEN PMEM1=PSYS1;
   END;
IF U2=TRUE
   THEN DO;
   J42=0;
   DLC2=DTH2;
   ULC2=ULC2+(DTACH2*GJ);
   IF UTACH2>2 THEN BR2=TRUE;
   IF PSYS2>=PMEM2 THEN BR2=TRUE;
   IF BR2=TRUE THEN PMEM2=PSYS2;
   END;
IF U3=TRUE
   THEN DO;
   DLC3=DTH3;
   IF DISP3<25000
   THEN DO;
      PMEM3=PSYS3;
      J73=PMEM3;
      LSTP1=PMEM1;
      LSTP2=PMEM2;
      END;
   END;
IF D1=TRUE
   THEN DO;
   J41=0;
   ULC1=0;
   DLC1=DLC1-(UTACH1*GG);
   IF PSYS1>=(PMEM1-GR) THEN BR1=TRUE;
   IF UTACH1>2 THEN BR1=TRUE;
   IF (DLC1>8000) AND (PSYS1>34) THEN BR1=TRUE;
   IF BR1=FALSE
      THEN DO;
      DLC1=DLC1+GD;
      GM=DLC1;
      END;
   IF BR1=TRUE
      THEN DO;
      DLC1=GM-GZ;
      PMEM1=PSYS1;
      END;
   END;
IF D2=TRUE
   THEN DO;
   J42=0;
   ULC2=0;
   DLC2=DLC2-(UTACH2*GG);
   IF PSYS2>=(PMEM2-GS) THEN BR2=TRUE;
   IF UTACH2>2 THEN BR2=TRUE;
   IF (DLC2>8000) AND (PSYS2>34) THEN BR2=TRUE;
   IF BR2=FALSE
      THEN DO;
      DLC2=DLC2+GD;
      GN=DLC2;
      END;
```

```
   IF BR2=TRUE
      THEN DO;
      DLC2=GN-GZ;
      PMEM2=PSYS2;
      END;
   END;
IF D3=TRUE
   THEN DO;
   IF H3<79
      THEN GX=15000;
      ELSE GX=((89-H3)*1500)+DTH3;
   IF PSYS3>=(PMEM3-GT) THEN BR3=TRUE;
   IF BR3=FALSE
      THEN DO;
      IF GX>(DLC3+GA)
         THEN DLC3=DLC3+GA;
         ELSE DLC3=GX;
      END;
   IF (DLC3>5000) AND (PSYS3>34) THEN BR3=TRUE;
   IF BR3=TRUE
      THEN DO;
      DLC3=DLC3-GY;
      PMEM3=PSYS3;
      J73=PMEM3;
      LSTP1=PMEM1;
      LSTP2=PMEM2;
      END;
   END;
IF (U1 OR D1)=FALSE
   THEN DO;
   BR1=FALSE;
   J41=J41+1;
   IF J41>200
      THEN DO;
      ULC1=0;
      DLC1=DTH1;
      END;
   END;
IF (U2 OR D2)=FALSE
   THEN DO;
   BR2=FALSE;
   J42=J42+1;
   IF J42>200
      THEN DO;
      ULC2=0;
      DLC2=DTH2;
      END;
   END;
IF (D3 OR U3)=FALSE
   THEN DO;
   BR3=FALSE;
   DLC3=DTH3;
   IF PMEM1<=LSTP1
      THEN DO;
      PCHG1=(LSTP1-PMEM1)*GV;
      END;
      ELSE DO;
      PCHG1=0;
      IF D1=TRUE THEN LSTP1=PMEM1;
      END;
   IF PMEM2<=LSTP2
      THEN DO;
      PCHG2=(LSTP2-PMEM2)*GV;
      END;
      ELSE DO;
      PCHG2=0;
      IF D2=TRUE THEN LSTP2=PMEM2;
      END;
```

```
   IF PCHG1>100 THEN PCHG1=100;
   IF PCHG2>100 THEN PCHG2=100;
   PMEM3=J73-PCHG1-PCHG2;
   END;
/*CLAM HOIST SPEED CORRECTION*/
IF (CLM=TRUE) AND (H2>149)
   THEN DO;
   J31=UTACH1;
   J32=UTACH2;
   IF J31>J32
      THEN DO;
      CC1=CC1+((J31-J32)*GL);
      CC2=CC2-((J31-J32)*GL);
      END;
   IF J32>J31
      THEN DO;
      CC2=CC2+((J32-J31)*GL);
      CC1=CC1-((J32-J31)*GL);
      END;
   END;
   ELSE DO;
   CC1=0;
   CC2=0;
   END;
/*MODIFICATION TO LOAD AND SPEED CORRECTION FACTORS TO LIMIT RANGE*/
IF CC1>30000 THEN CC1=0;
IF CC2>30000 THEN CC2=0;
IF ULC1>30000 THEN ULC1=0;
IF ULC2>30000 THEN ULC2=0;
IF DLC1>30000 THEN DLC1=0;
IF DLC2>30000 THEN DLC2=0;
IF DLC3>30000 THEN DLC3=0;
IF CC1>8000 THEN CC1=8000;
IF CC2>8000 THEN CC2=8000;
IF ULC1>8000 THEN ULC1=8000;
IF ULC2>8000 THEN ULC2=8000;
IF DLC1>8000 THEN DLC1=8000;
IF DLC2>8000 THEN DLC2=8000;
IF DLC3>5000 THEN DLC3=5000;
/*FRONT HOIST DRUM*/
OB1=OB1 AND OF7H;
IF H1>149
   THEN DO;
   D1=FALSE;
   U1=TRUE;
   IF BR1=TRUE THEN OB2=OB2 OR 08H;
   IF H1>229
      THEN CMD1=51000;
      ELSE CMD1=31000+((H1-149)*250);
   DISP1=CMD1+ULC1;
   END;
IF H1<89
   THEN DO;
   U1=FALSE;
   D1=TRUE;
   IF BR1=TRUE THEN OB2=OB2 OR 08H;
   IF H1<9
      THEN CMD1=1000;
      ELSE CMD1=29000-((89-H1)*350);
   IF BR1=FALSE
      THEN DISP1=29000+DLC1;
      ELSE DISP1=CMD1+DLC1;
   END;
IF (H1<=149) AND (H1>=89)
   THEN DO;
   IF (H1>146) AND (U1=TRUE)
      THEN DISP1=31000+ULC1;
      ELSE U1=FALSE;
```

```
      IF (H1<92) AND (D1=TRUE)
         THEN DISP1=29000+DLC1;
         ELSE D1=FALSE;
      IF (U1=FALSE) AND (D1=FALSE)
         THEN DO;
         OB2=OB2 AND 0F7H;
         CMD1=30000;
         DISP1=CMD1;
         END;
      END;
   /*REAR HOIST DRUM*/
   OB1=OB1 AND 0EFH;
   IF H2>149
      THEN DO;
      D2=FALSE;
      U2=TRUE;
      IF BR2=TRUE THEN OB2=OB2 OR 10H;
      IF H2>229
         THEN CMD2=51000;
         ELSE CMD2=31000+((H2-149)*250);
      DISP2=CMD2+ULC2;
      END;
   IF H2<89
      THEN DO;
      U2=FALSE;
      D2=TRUE;
      IF BR2=TRUE THEN OB2=OB2 OR 10H;
      IF H2<9
         THEN CMD2=1000;
         ELSE CMD2=29000-((89-H2)*350);
      IF BR2=FALSE
         THEN DISP2=29000+DLC2;
         ELSE DISP2=CMD2+DLC2;
      END;
   IF (H2<=149) AND (H2>=89)
      THEN DO;
      IF (H2>146) AND (U2=TRUE)
      THEN DISP2=31000+ULC2;
      ELSE U2=FALSE;
   IF (H2<92) AND (D2=TRUE)
      THEN DISP2=29000+DLC2;
      ELSE D2=FALSE;
   IF (U2=FALSE) AND (D2=FALSE)
      THEN DO;
      OB2=OB2 AND 0EFH;
      CMD2=30000;
      DISP2=CMD2;
      END;
   END;
/*BOOM HOIST*/
IF H3>149
   THEN DO;
   OB2=OB2 AND 0DFH;
   U3=TRUE;
   IF H3>229
      THEN CMD3=1000;
      ELSE CMD3=29000-((H3-149)*350);
   DISP3=CMD3;
   END;
   ELSE DO;
   U3=FALSE;
   END;
IF H3<89
   THEN DO;
   D3=TRUE;
   IF H3<9
      THEN CMD3=59000;
      ELSE CMD3=30000+((89-H3)*362);
```

```
   IF BR3=TRUE THEN OB2=OB2 OR 20H;
   IF BR3=FALSE
      THEN DISP3=30000-DLC3;
      ELSE DISP3=CMD3-DLC3;
   END;
   ELSE DO;
   D3=FALSE;
   END;
IF (U3=FALSE) AND (D3=FALSE)
   THEN DO;
   OB2=OB2 AND ODFH;
   CMD3=30000;
   DISP3=CMD3;
   END;
/*SWING*/
IF H4>144
   THEN DO;
   RT=TRUE;
   IF H4>224
      THEN CMD4=50000;
      ELSE CMD4=40000+((H4-144)*125);
   END;
   ELSE DO;
   RT=FALSE;
   END;
IF H4<94
   THEN DO;
   LT=TRUE;
   IF H4<14
      THEN CMD4=10000;
      ELSE CMD4=20000-((94-H4)*125);
   END;
   ELSE DO;
   LT=FALSE;
   END;
IF (RT=FALSE) AND (LT=FALSE)
   THEN DO;
   CMD4=30000;
   PCOM4=CMD4;
   END;
PCOM4=CMD4;
OB2=OB2 OR 40H;
/*RIGHT TRACK*/
IF H5>149
   THEN DO;
   FR=TRUE;
   IF H5>229
      THEN CMD5=59000;
      ELSE CMD5=31000+((H5-149)*350);
   IF CMD5>=DISP5
      THEN DO;
      IF (CMD5-DISP5)>GI
         THEN DISP5=DISP5+GI;
         ELSE DISP5=CMD5;
      END;
      ELSE DO;
      DISP5=CMD5;
      END;
   END;
   ELSE DO;
   FR=FALSE;
   END;
IF H5<89
   THEN DO;
   RR=TRUE;
   IF H5<9
      THEN CMD5=1000;
      ELSE CMD5=29000-((89-H5)*350);
```

```
   IF CMD5<DISP5
      THEN DO;
      IF (DISP5-CMD5)>GI
         THEN DISP5=DISP5-GI;
         ELSE DISP5=CMD5;
      END;
      ELSE DO;
      DISP5=CMD5;
      END;
   END;
   ELSE DO;
   RR=FALSE;
   END;
IF (FR=FALSE) AND (RR=FALSE)
   THEN DO;
   CMD5=30000;
   DISP5=CMD5;
   END;
/*LEFT TRACK*/
IF H6>149
   THEN DO;
   FL=TRUE;
   IF H6>229
      THEN CMD6=59000;
      ELSE CMD6=31000+((H6-149)*350);
   IF CMD6>=DISP6
      THEN DO;
      IF (CMD6-DISP6)>GI
         THEN DISP6=DISP6+GI;
         ELSE DISP6=CMD6;
      END;
      ELSE DO;
      DISP6=CMD6;
      END;
   END;
   ELSE DO;
   FL=FALSE;
   END;
IF H6<89
   THEN DO;
   RL=TRUE;
   IF H6<9
      THEN CMD6=1000;
      ELSE CMD6=29000-((89-H6)*350);
   IF CMD6<DISP6
      THEN DO;
      IF (DISP6-CMD6)>GI
         THEN DISP6=DISP6-GI;
         ELSE DISP6=CMD6;
      END;
      ELSE DO;
      DISP6=CMD6;
      END;
   END;
   ELSE DO;
   RL=FALSE;
   END;
IF (FL=FALSE) AND (RL=FALSE)
   THEN DO;
   CMD6=30000;
   DISP6=CMD6;
   END;
/*TRAVEL BRAKE*/
IF (CMD5<>30000) OR (CMD6<>30000)
   THEN OB3=OB3 OR 10H;
   ELSE OB3=OB3 AND 0EFH;
/*FRONT AND REAR DRUM ROTATION INDICATORS*/
SPAN1=((255-UTACH1-DTACH1)/5);
```

```
SPAN2=((255-UTACH2-DTACH2)/5);
IF SPAN1<8 THEN SPAN1=8;
IF SPAN2<8 THEN SPAN2=8;
IF SPAN1<51
   THEN DO;
   J21=J21+1;
   IF J21>SPAN1
      THEN DO;
      OB1=OB1 OR 80H;
      ON1=ON1+1;
      IF ON1>2
         THEN DO;
         ON1=0;
         J21=0;
         OB1=OB1 AND 7FH;
         END;
      END;
   END;
   ELSE DO;
   J21=0;
   ON1=0;
   OB1=OB1 AND 7FH;
   END;
IF SPAN2<51
   THEN DO;
   J22=J22+1;
   IF J22>SPAN2
      THEN DO;
      OB3=OB3 OR 08H;
      ON2=ON2+1;
      IF ON2>2
         THEN DO;
         ON2=0;
         J22=0;
         OB3=OB3 AND 0F7H;
         END;
      END;
   END;
   ELSE DO;
   ON2=0;
   J22=0;
   OB3=OB3 AND 0F7H;
   END;
/*SET MODIFICATIONS TO OUTPUT COMMANDS*/
/*MODIFICATION TO TRAVEL COMMAND FOR DIVERTING*/
IF ((I2.B2 OR I2.B3 OR I2.B4 OR I2.B5)=1B)
   THEN DO;
   OB3=OB3 AND 0EFH;
   DISP5=30000;
   DISP6=30000;
   END;
/*MODIFICATION TO BOOM HOIST COMMAND FOR COUNTERWIEGHT HANDLING*/
IF I1.B3=1B
   THEN DO;
   OB2=OB2 AND 0DFH;
   IF I3.B5=1B THEN DISP3=19000;
   IF I3.B4=1B
      THEN DO;
      DISP3=41000;
      OB2=OB2 OR 20H;
      END;
   IF (I3.B4 OR I3.B5)=0B THEN DISP3=30000;
   END;
/*MODIFICATION TO FRONT AND REAR HOIST COMMANDS FOR F'FALL OR CLAM
OPERATION*/
IF (FFL OR CLM)=TRUE
   THEN DO;
   IF U1=TRUE
```

```
      THEN OB1=OB1 AND 0F7H;
      ELSE OB1=OB1 OR 08H;
   IF U2=TRUE
      THEN OB1=OB1 AND 0EFH;
      ELSE OB1=OB1 OR 10H;
   OB2=OB2 OR 10H;
   OB2=OB2 OR 08H;
   END;
/*MODIFICATION TO FRONT AND REAR HOIST COMMANDS FOR CLAM OPERATION*/
IF CLM=TRUE
   THEN DO;
   IF H2>149
      THEN DO;
      U1=TRUE;
      OB1=OB1 AND 0F7H;
      DISP1=CMD2-CC1;
      DISP2=CMD2-CC2;
      END;
   END;
/*SET FAULT FLAGS*/
/*HANDLE FAULT FLAGS*/
IF (H1>250) OR (H1<5)
   THEN HPF1=FALSE;
   ELSE HPF1=TRUE;
IF (H2>250) OR (H2<5)
   THEN HPF2=FALSE;
   ELSE HPF2=TRUE;
IF (H3>250) OR (H3<5)
   THEN HPF3=FALSE;
   ELSE HPF3=TRUE;
IF (H4>250) OR (H4<5)
   THEN HPF4=FALSE;
   ELSE HPF4=TRUE;
IF (H5>250) OR (H5<5)
   THEN HPF5=FALSE;
   ELSE HPF5=TRUE;
IF (H6>250) OR (H6<5)
   THEN HPF6=FALSE;
   ELSE HPF6=TRUE;
/*LOW CHARGE PRESSURE FAULT FLAGS*/
IF (PSYS1<27) AND (PSYS1>16)
   THEN J51=J51+1;
   ELSE J51=0;
IF (PSYS2<27) AND (PSYS2>16)
   THEN J52=J52+1;
   ELSE J52=0;
IF (PSYS3<27) AND (PSYS3>16)
   THEN J53=J53+1;
   ELSE J53=0;
IF (CPH<40) AND (CPH>16)
   THEN JH=JH+1;
   ELSE JH=0;
IF (CP5<30) AND (CP5>16)
   THEN J5=J5+1;
   ELSE J5=0;
IF (CP6<30) AND (CP6>16)
   THEN J6=J6+1;
   ELSE J6=0;
IF JH>200 THEN JH=200;
IF J5>200 THEN J5=200;
IF J6>200 THEN J6=200;
IF J51>200 THEN J51=200;
IF J52>200 THEN J52=200;
IF J53>200 THEN J53=200;
IF (JH>30)
   THEN DO;
   IF (CMD1<>30000) AND (DTACH1>60) THEN CPFH=FALSE;
   IF (CMD2<>30000) AND (DTACH2>60) THEN CPFH=FALSE;
   END;
```

```
IF (J5>150) AND (CMD5<>30000) THEN CPF5=FALSE;
IF (J6>150) AND (CMD6<>30000) THEN CPF6=FALSE;
IF (J51>20) AND (DTACH1>60) AND (CMD1<>30000) THEN SPF1=FALSE;
IF (J52>20) AND (DTACH2>60) AND (CMD2<>30000) THEN SPF2=FALSE;
IF (J53>10) AND (CMD3<>30000) THEN SPF3=FALSE;
IF (CPH>40) AND (CMD1=30000) AND (CMD2=30000) THEN CPFH=TRUE;
IF (CP5>30) AND (CMD5=30000) THEN CPF5=TRUE;
IF (CP6>30) AND (CMD6=30000) THEN CPF6=TRUE;
IF (PSYS1>27) AND (CMD1=30000) THEN SPF1=TRUE;
IF (PSYS2>27) AND (CMD2=30000) THEN SPF2=TRUE;
IF (PSYS3>27) AND (CMD3=30000) THEN SPF3=TRUE;
/*PRESSURE TRANSDUCER FAULT FLAGS*/
IF (PSYS1>240) OR (PSYS1<15)
   THEN STF1=FALSE;
   ELSE STF1=TRUE;
IF (PSYS2>240) OR (PSYS2<15)
   THEN STF2=FALSE;
   ELSE STF2=TRUE;
IF (PSYS3>240) OR (PSYS3<15)
   THEN STF3=FALSE;
   ELSE STF3=TRUE;
IF (CPH>240) OR (CPH<15)
   THEN CTFH=FALSE;
   ELSE CTFH=TRUE;
IF (CP5>240) OR (CP5<15)
   THEN CTF5=FALSE;
   ELSE CTF5=TRUE;
IF (CP6>240) OR (CP6<15)
   THEN CTF6=FALSE;
   ELSE CTF6=TRUE;
/*MISDIRECTION FAULT FLAGS*/
IF (DTACH1>5) AND (U1=TRUE)
   THEN J61=J61+1;
   ELSE J61=0;
IF (DTACH2>5) AND (U2=TRUE)
   THEN J62=J62+1;
   ELSE J62=0;
IF J61>250 THEN J61=250;
IF J62>250 THEN J62=250;
IF J61>120 THEN MDF1=FALSE;
IF J62>120 THEN MDF2=FALSE;
IF CMD1=30000 THEN MDF1=TRUE;
IF CMD2=30000 THEN MDF2=TRUE;
/*GENERAL OPERATING LIMIT FAULT FLAGS*/
OLF1=TRUE;
OLF2=TRUE;
OLF3=TRUE;
OLF4=TRUE;
OLF5=TRUE;
OLF6=TRUE;
IF ((I1.B5 AND (I2.B6 OR I2.B1))=0B) AND (U1=TRUE) THEN OLF1=FALSE;
IF ((I2.B8 OR I1.B8)=0B) AND (D1=TRUE) THEN OLF1=FALSE;
IF ((I1.B5 AND (I2.B7 OR I2.B1))=0B) AND (U2=TRUE) THEN OLF2=FALSE;
IF ((I3.B1 OR I1.B8)=0B) AND (D2=TRUE) THEN OLF2=FALSE;
IF ((I1.B5 AND (I3.B3 OR I2.B1))=0B) AND (D3=TRUE) THEN OLF3=FALSE;
IF ((I3.B2 OR I2.B1)=0B) AND (U3=TRUE) THEN OLF3=FALSE;
IF (I1.B3=1B) AND (CMD3<>30000) THEN OLF3=FALSE;
IF ((I2.B2 OR I2.B3 OR I2.B4 OR I2.B5)=1B) AND (CMD5<>30000) THEN
OLF5=FALSE;
IF ((I2.B2 OR I2.B3 OR I2.B4 OR I2.B5)=1B) AND (CMD6<>30000) THEN
OLF6=FALSE;
/*DUTCH INTERLOCK OPERATING LIMIT FAULT FLAG*/
IF (FFL=FALSE) AND (CLM=FALSE)
   THEN DO;
   IF (CMD1<>30000) AND (CMD2=30000) THEN JA=TRUE;
   IF (CMD2<>30000) AND (CMD1=30000) THEN JA=FALSE;
   IF JA=TRUE
```

```
      THEN DO;
      IF CMD2<>30000 THEN OLF2=FALSE;
      END;
      ELSE DO;
      IF CMD1<>30000 THEN OLF1=FALSE;
      END;
   END;
/*DUTCH SEAT SWITCH OPERATING LIMIT FLAG*/
IF I1.B6=0B
   THEN DO;
   OLF1=FALSE;
   OLF2=FALSE;
   OLF3=FALSE;
   OLF4=FALSE;
   END;
/*FREE FALL AND CLAM MODE OPERATING LIMIT FAULT FLAG*/
IF ((I1.B1 OR I1.B2 OR I1.B7)=1B) AND ((FFL OR CLM)=FALSE)
   THEN DO;
   OLF1=FALSE;
   OLF2=FALSE;
   END;
/*SET FAULT RESPONSE*/
/*BRAKE, CLUTCH AND PUMP CONTROL FAULT RESPONSE*/
IF (SPF1 AND HPF1 AND OLF1 AND CPFH AND MDF1)=FALSE
   THEN DO;
   DISP1=30000;
   OB1=OB1 AND 0F7H;
   OB2=OB2 AND 0F7H;
   END;
IF (SPF2 AND HPF2 AND OLF2 AND CPFH AND MDF2)=FALSE
   THEN DO;
   DISP2=30000;
   OB1=OB1 AND 0EFH;
   OB2=OB2 AND 0EFH;
   END;
IF (SPF3 AND HPF3 AND OLF3)=FALSE
   THEN DO;
   DISP3=30000;
   OB2=OB2 AND 0DFH;
   END;
IF (HPF4 AND OLF4)=FALSE THEN PCOM4=30000;
IF (CPF5 AND CPF6 AND HPF5 AND HPF6)=FALSE
   THEN DO;
   DISP5=30000;
   DISP6=30000;
   OB3=OB3 AND 0EFH;
   END;
/*WARNING LAMPS*/
IF (FFL=TRUE) OR (CLM=TRUE)
   THEN OB1=OB1 OR 20H;
   ELSE OB1=OB1 AND 0DFH;
IF (SPF1 AND SPF2 AND SPF3 AND CPFH AND CPF5 AND CPF6)=FALSE
   THEN OB2=OB2 OR 80H;
   ELSE OB2=OB2 AND 7FH;
IF (OLF1 AND OLF2 AND OLF3 AND OLF4 AND OLF5 AND OLF6 AND MDF1 AND
MDF2)=FALSE
   THEN DO;
   JC=JC+1;
   IF JC>=128
      THEN DO;
      OB2=OB2 OR 80H;
      OB1=OB1 OR 20H;
      END;
      ELSE DO;
      OB2=OB2 AND 7FH;
      OB1=OB1 AND 0DFH;
      END;
   END;
```

```
IF (HPF1 AND HPF2 AND HPF3 AND HPF4 AND HPF5 AND HPF6)=FALSE
   THEN DO;
   JC=JC+1;
   IF JC<30
      THEN DO;
      OB2=OB2 OR 80H;
      OB1=OB1 OR 20H;
      END;
      ELSE DO;
      OB2=OB2 AND 7FH;
      OB1=OB1 AND ODFH;
      IF JC>60 THEN JC=0;
      END;
   END;
IF (STF1 AND STF2 AND STF3 AND CTFH AND CTF5 AND CTF6)=FALSE
   THEN DO;
   JE=JE+1;
   IF JE<=128
      THEN DO;
      OB2=OB2 OR 80H;
      END;
      ELSE DO;
      OB2=OB2 AND 7FH;
      END;
   END;
/*SET OUTPUTS*/
/*PUMP CONTROL OUTPUTS*/
PC1=DISP1/234;
PC2=DISP2/234;
PC3=DISP3/234;
PC4=PCOM4/234;
PC5=DISP5/234;
PC6=DISP6/234;
/*ON-OFF OUTPUTS*/
OB4=OB1;
OB5=OB2;
OB6=OB3;
/* RESTORE BASIC BYTES IN BIT SPACE */
BASIC28=SAVE_BASIC28;
BASIC29=SAVE_BASIC29;
BASIC2A=SAVE_BASIC2A;
RETURN;
END M;
```

I claim:

1. A control system for a liftcrane having mechanical subsystems powered by an engine and connected thereto by a closed loop hydraulic system having individual closed hydraulic loops associated with the mechanical subsystems, comprising:

a first mechanical subsystem powered by the engine and connected thereto by a first closed hydraulic loop, a first set of controls for outputting signals for operation of said first mechanical subsystem.

a first sensor operable to sense the pressure in the closed hydraulic loop and for outputting signals indicative thereof, a mode selector for providing an operator with a selection of alternative modes of liftcrane mechanical subsystem operation and adapted to output a signal representative of said selection and wherein at least two of the alternative modes of liftcrane mechanical subsystem operation are fully operational modes; and a programmable controller connected to said set of controls, said first sensor, and said mode selector, said programmable controller adapted to run a routine operable to output signals to said first mechanical subsystem for the operation thereof based upon the signals output by said set of controls, said first sensor, and said mode selector.

2. The control system of claim 1 further comprising:

a second sensor operable to sense the position or speed of said first mechanical subsystem, said second sensor also connected and operable to provide an output to said controller indicative of the position or speed of said first mechanical subsystem, and further in which said programmable controller is adapted to run a routine operable to output signals to said first mechanical subsystem for the operation thereof based upon the outputs of said set of controls and said second sensor.

3. The control system of claim 2 further comprising:

a second mechanical subsystem powered by the engine and connected thereto by a second closed hydraulic loop, a second set of controls connected and adapted to operate said second mechanical subsystem.

4. The control system of claim 3 further comprising:

a third sensor adapted and operable to sense operation of said second set of controls, said third sensor also connected and operable to provide an output to said programmable controller indicative of the status of operation of said second subsystem.

5. The control system of claim 1 further comprising:

a remote control panel connected and adapted to output signals to said programmable controller for operation of said mechanical subsystem.

6. The control system of claim 5 further comprising:

a third mechanical subsystem powered by the engine and connected thereto by a third closed hydraulic, said third mechanical subsystem connected to and adapted to be operated by said remote control panel.

7. The control system of claim 1 further comprising:

a display connected to said programmable controller, said display adapted to indicate to an operator of the liftcrane the status of operation of the mechanical subsystem.

8. A control system for operation of liftcrane having mechanical subsystems powered by a engine, each mechanical subsystem connected thereto by an individual closed hydraulic loop, comprising:

a first mechanical subsystem powered by the engine and connected thereto by a closed hydraulic loop, a first set of controls for outputting signals for operation of said first mechanical subsystem, a first sensor operable to sense the pressure in the closed hydraulic loop connected to said first mechanical subsystem and to provide an output signal indicative thereof, and a programmable controller connected to said first set of controls, said first sensor, and said first mechanical subsystem, a mode selector for selecting a desired mode of operation of the first mechanical subsystem, and an operating routine adapted to run on said programmable controller, said operating routine comprising:

first information corresponding to a range of possible signals that can be received from said first set of controls, and at least two sets of second information each set corresponding to a range of possible operations of said first mechanical subsystem, said first information being related to each of said sets of second information, and further wherein one of said sets of second information is related to the first information based upon an input from the mode selector, whereby said first mechanical subsystem can be operated in accordance with an operating routine run on said programmable controller based upon the output signals of said first set of controls and said first sensor.

9. The control system of claim 8 further comprising:

a second mechanical subsystem powered by the engine and connected thereto by a closed hydraulic loop, a second sensor operable to sense at least one of the position and speed of the second mechanical subsystem, said second sensor also connected and operable to provide an output to said programmable controller indicative of the at least one of position and speed of said second mechanical subsystem, and further in which said programmable controller is connected to said second mechanical subsystem, whereby said second mechanical subsystem can be operated in accordance with an operating routine run on said programmable controller based upon the output signals of said controls and said second sensor.

10. The improved control system of claim 9 further comprising:

an operating routine stored in a memory of said programmable controller, said operating routine comprising executable instructions for the control and operation of mechanical subsystems of the liftcrane based upon inputs from said controls and sensors.

11. An improved control system for a liftcrane having a plurality of mechanical subsystems powered by an engine and each connected thereto by an individual closed hydraulic loop, the system comprising:

a set of controls for outputting signals for operation of the mechanical subsystems of the liftcrane, a set of sensors operable to sense the pressure in at least some of the closed hydraulic loops and for outputting signals indicative thereof, a mode selector for providing an operator with a selection of alternative modes of liftcrane mechanical subsystem operation and adapted to output a signal representative of said selection and wherein at last two of the alternative modes of liftcrane mechanical subsystem operation are fully operational modes; and a programmable controller connected to said set of controls, said mode selector, and said set of sensors, said programmable controller adapted to run a routine operable to output signals to the mechanical subsystems for the control thereof based upon the signals output by said set of controls, said mode selector, and said first set of sensors.

12. The system of claim 11 further comprising:

a diverting valve interconnecting at least two of said closed hydraulic loops, said diverting valve connected to said programmable controller whereby upon operation of said controls under control of said programmable controller hydraulic pressure can be diverted between closed hydraulic loops.

13. An improved method for controlling operation of a liftcrane having and engine and mechanical subsystems each powered by a closed hydraulic loop driven by the engine, comprising the steps of:

lifting a load with a hoist and a boom;

applying a brake to the hoist to prevent the load from slipping, sensing with a sensor associated with the hoist the application of the brake to the hoist;

storing data in a memory indicative of the pressure sensed by the sensor associated with the hoist at the time when the brake is applied to said hoist;

applying pressure to the hoist equal to the pressure indicated by the data stored in the memory; and releasing the brake.

14. An improved method for performing clamshell work with a liftcrane having an engine and mechanical subsystems each powered by a closed hydraulic loop driven by the engine, comprising the steps of:

supporting a the load in a clamshell with a first line connected to a hoist drum;

sensing the pressure in a first closed hydraulic loop connected to a first pump associated with the hoist drum, outputting a signal indicative of the pressure sensed in the first closed hydraulic loop to a programmable controller, and commanding with the programmable controller a second pump associated with a second hoist drum to maintain a force on a second line connected to the clamshell said force related to the pressure sensed in the first closed hydraulic loop.

15. The method of claim 14 in which the said force commanded in the second line is related to the pressure sensed in the first closed hydraulic loop in a manner that the tension in the second line is less than the tension in the first line.

16. An improved method for performing swing operation in a liftcrane having an engine and mechanical subsystems each powered by a closed hydraulic loop driven by the engine, comprising the steps of:

outputting a signal from a control handle to a programmable controller to indicate the desired operation of the swing in a first mode;

sensing the pressures in a first hydraulic line associated with the swing motor with a first pressure sensor and in a second hydraulic line associated with the swing motor with a second pressure sensor, the first and second hydraulic lines forming a closed hydraulic loop connected to a pump driven by the engine;

outputting signals to a programmable controller from the first and second pressure sensors; and outputting a signal from the programmable controller to the pump to operate the swing based upon a comparison of the signals received from the first pressure sensor, the second pressure sensor, and the control handle.

17. The method of claim 15 further comprising the steps of:

outputting a signal from a control handle to a programmable controller to indicate the desired operation of the swing in a second mode; and outputting a signal from the programmable controller to the pump to operate the swing based upon the signal received from the control handle.

18. An improved method for controlling operation of a liftcrane having an engine and a hose powered by a closed hydraulic loop driven by the engine, comprising the steps of:

lifting a load with the hoist;

applying a brake to the hoist to prevent the load from slipping, storing data in a computer memory indicative of the pressure in the closed hydraulic loop that powers the hoist when the brake is applied to said hoist;

applying pressure to the hoist at least equal to the pressure indicated by the data stored in the computer memory; and releasing the brake.

19. The method of claim 18 further comprising the steps of:

after the step of applying a brake to the hoist, sensing with a sensor associated with the closed hydraulic loop that powers the hoist the pressure in the closed hydraulic loop at the time of the application of the brake to the hoist, and storing data in the computer memory indicative of the pressure sensed.

20. A method of operating a liftcrane having a mechanical subsystem powered by an engine and connected thereto by a closed hydraulic loop, controls in an operator's cab for outputting signals for operation of said mechanical subsystem, a sensor operable to sense the pressure in the closed hydraulic loop and for outputting signals indicative thereof, and a programmable controller connected to said controls and said sensor, said programmable controller adapted to run a routine operable to output signals from said controller to said first mechanical subsystem for the operation thereof based upon the signals output by said controls and said sensor, the method comprising the steps of:

operating the controls to produce signals indicative of the desired liftcrane subsystem operation;

outputting said signals to the programmable controller;

running an operating routine on said programmable controller, said operating routine having:

first information corresponding to a range of possible signals that can be received from said controls, and at least two sets of second information corresponding to a range of possible operation of said liftcrane subsystem, said first information being related to each of said sets of second information, relating said first information with said second information, outputting a signal from said programmable controller to said mechanical subsystem representative of said second information, and operating said mechanical subsystem based upon said signal output from said programmable controller.

21. The method of claim 20 in which said liftcrane further comprises a mode selection control operable by the liftcrane operator, and the method further comprises the steps of:

selecting a mode of operation with said mode selector;

outputting a signal from said mode selector to said programmable controller indicative of the mode selected;

said operating routine further comprising:

more than one possible second information corresponding to said first information, and third information corresponding to a range of possible modes, said third information providing for selection of one of said possible second information to relate to said first information.

22. The method of claim 20 in which said liftcrane further comprises multiple mechanical subsystems each connected to the engine by a closed hydraulic loop, and a diverting valve interconnecting at least two of said closed hydraulic loops, and the method further comprises the steps of:

operating said controls to effect a desired operation of one of said mechanical subsystems, outputting a signal from said programmable controller to operate said diverting valve to divert pressure from a closed hydraulic loop associated with another of said mechanical subsystems to a closed hydraulic loop associated with the one mechanical subsystem, whereby the one mechanical subsystem can be powered by the closed hydraulic loops associated with both the one and the other mechanical subsystem.

23. The method of claim 20 in which said multiple mechanical subsystems include a hoist and a boom and in which the desired liftcrane operation is to move a load horizontally at a desired height, the method further comprising the steps of:

operating said controls to produce a signal to indicate operation of the hoist to lift a load to the desired height;

outputting a signal from said programmable controller to operate said hoist to lift the load to the desired height;

operating said controls to produce a signal to indicate operation of said hoist and said boom together to move the load horizontally at the given height;

calculating with said programmable controller operation of said boom and said hoist together to move the load horizontally at the given height;

outputting from said programmable controller signals to said boom and to said hoist to operate each to move the load horizontally at the given height.

* * * * *

US005297019C1

(12) EX PARTE REEXAMINATION CERTIFICATE (5069th)

United States Patent
Zuehlke

(10) Number: US 5,297,019 C1
(45) Certificate Issued: Mar. 1, 2005

(54) CONTROL AND HYDRAULIC SYSTEM FOR LIFTCRANE

(75) Inventor: Arthur G. Zuehlke, Manitowoc, WI (US)

(73) Assignee: Manitowoc Crane Group, Inc., Reno, NV (US)

Reexamination Request:
No. 90/005,624, Jan. 28, 2000

Reexamination Certificate for:

| | |
|---|---|
| Patent No.: | **5,297,019** |
| Issued: | **Mar. 22, 1994** |
| Appl. No.: | **07/566,751** |
| Filed: | **Aug. 13, 1990** |

Related U.S. Application Data

(63) Continuation-in-part of application No. 07/418,879, filed on Oct. 10, 1989, now Pat. No. 5,189,605.

(51) Int. Cl.[7] .......................... G06F 19/00; G05B 11/01
(52) U.S. Cl. .............................................. 701/50; 700/1
(58) Field of Search .......................... 700/1, 11, 19–27; 701/50; 60/327, 426, 328, 443, 469, 459, 466; 91/207; 340/685; 180/234; 137/596.18

(56) References Cited

U.S. PATENT DOCUMENTS

| | | | |
|---|---|---|---|
| 2,030,529 A | 2/1936 | Nash | 116/114 |
| 3,265,360 A | 8/1966 | Tax | 254/173 |
| 3,335,568 A | 8/1967 | Van De Hey | 60/54 |
| 3,531,088 A | 9/1970 | Kraschnewski | 254/184 |

(List continued on next page.)

FOREIGN PATENT DOCUMENTS

| | | | |
|---|---|---|---|
| DE | 3115471 A1 | | 10/1982 |
| DE | 3323694 A1 | | 1/1985 |
| DE | 3611553 C1 | | 7/1987 |
| DE | 0364994 A1 | | 10/1989 |
| EP | 0 076 485 A1 | | 4/1983 |
| EP | 0 253 657 A2 | | 1/1988 |
| FR | 72.00064 | | 1/1972 |
| GB | 2 234 728 A | | 2/1991 |
| JP | 55035785 | | 3/1980 |
| JP | 55-52884 | * | 4/1980 |
| JP | 56-160458 | | 12/1981 |
| JP | 57-123332 | | 7/1982 |
| JP | 58041126 A | | 3/1983 |
| JP | 58062228 A | | 4/1983 |
| JP | 59-194989 | * | 11/1984 |
| JP | 60-125455 | | 7/1985 |
| JP | 61-55093 | | 3/1986 |
| JP | 61151339 A | | 7/1986 |
| JP | 63-31995 | | 2/1988 |
| JP | 63-62902 | * | 3/1988 |
| JP | 1-242712 | * | 9/1989 |
| JP | 40213079 | | 8/1992 |
| RU | 161107 | | 3/1964 |
| RU | 32 12378/29-11 | | 7/1982 |
| WO | WO 88/05937 | | 11/1988 |

OTHER PUBLICATIONS

Engineering Group, Daikin Industries, Ltd., FAQ–Hydraulic System in Machines, vol. 2, pp. 18–21 and 334, 1974.

(List continued on next page.)

*Primary Examiner*—L. P. Picard

(57) ABSTRACT

An improved control system for operation of a liftcrane having mechanical subsystems powered by a engine and connected thereto by a closed loop hydraulic system with one or more individual closed hydraulic loops. The liftcrane includes controls for outputting signals for operation of the mechanical subsystems and a programmable controller connected and responsive to the controls and connected to the mechanical subsystems. The programmable controller is capable of running a routine for controlling the mechanical subsystems. A first set of sensors is operable to sense the pressure in the closed loop hydraulic system at each of the mechanical subsystems in a first set of mechanical subsystems and provide an output to the programmable controller indicative of the hydraulic pressure sensed. A second set of sensors is operable to sense the position or speed of each of the mechanical subsystems in a second set of mechanical subsystems and provide an output to the programmable controller indicative of the position sensed.

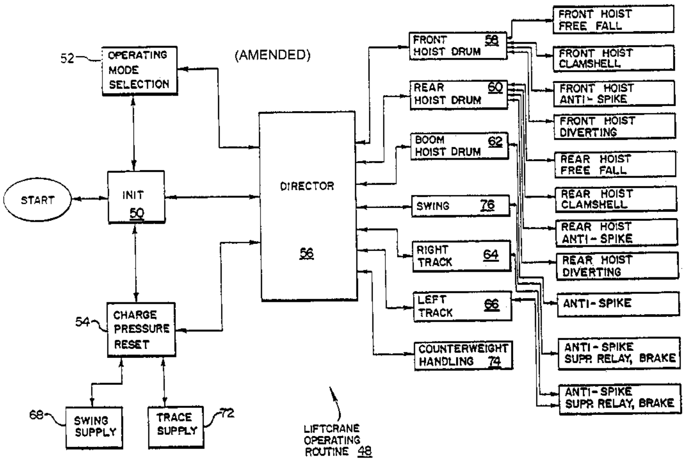

U.S. PATENT DOCUMENTS

| | | | | | |
|---|---|---|---|---|---|
| 3,620,504 | A | | 11/1971 | Morrison | 254/188 |
| 3,661,279 | A | | 5/1972 | Macrander | 214/15 R |
| 3,734,564 | A | | 5/1973 | McKay et al. | 299/9 |
| 3,759,489 | A | | 9/1973 | Jones | 254/173 R |
| 3,851,766 | A | | 12/1974 | Gill et al. | 212/20 |
| 4,144,974 | A | | 3/1979 | Longthorpe | 212/18 |
| 4,178,591 | A | | 12/1979 | Geppert | 340/685 |
| 4,180,171 | A | | 12/1979 | Cunningham et al. | 212/61 |
| 4,185,280 | A | | 1/1980 | Wilhelm | 340/685 |
| 4,227,676 | A | | 10/1980 | Vaillant et al. | 254/277 |
| 4,261,119 | A | | 4/1981 | Kubo et al. | 37/195 |
| 4,268,013 | A | | 5/1981 | Khan | 254/392 |
| 4,370,713 | A | | 1/1983 | McCoy, Jr. et al. | 364/424 |
| 4,451,893 | A | | 5/1984 | Izumi et al. | 364/494 |
| 4,489,551 | A | | 12/1984 | Watanabe et al. | 60/328 |
| 4,506,791 | A | | 3/1985 | Brösigke | 212/190 |
| 4,510,750 | A | | 4/1985 | Izumi et al. | 60/443 |
| 4,514,796 | A | | 4/1985 | Saulters et al. | 364/142 |
| 4,532,595 | A | | 7/1985 | Wilhelm | 364/463 |
| 4,554,947 | A | * | 11/1985 | Cobb, III | 137/596.18 |
| 4,606,313 | A | | 8/1986 | Izumi et al. | 123/386 |
| 4,782,662 | A | | 11/1988 | Reeves et al. | 60/327 |
| 4,815,614 | A | | 3/1989 | Putkonen et al. | 212/146 |
| 4,953,723 | A | | 9/1990 | Saotome et al. | 212/159 |
| 4,969,562 | A | | 11/1990 | Saotome | 212/261 |
| 4,995,472 | A | | 2/1991 | Hayashi et al. | 364/200 |
| 5,029,067 | A | | 7/1991 | Nishida et al. | 364/175 |
| 5,160,056 | A | | 11/1992 | Yoshimatsu et al. | 212/155 |
| 5,189,605 | A | | 2/1993 | Zuehlke et al. | 701/50 |

OTHER PUBLICATIONS

"650–t–Raupenkran für Japan" in *Fahrzeugkrane*, dht12/85–[438]33, (one page, with two pages of translation), (Dec. 1985).

N. Rückgauer, "Hydraulic Drives in Crane Construction", in *Ölhydraulik und pneumatik*, pp. 150–163 (1986). (Translation only).

Dip. Ing Gotthard Drieschner, "Computer–Hydraulik am Bau" (Computer Hydraulics in the Construction) *Mikroprozessor in Hydraulikbaggern Fluid*, pp. 21 & 22 (Jun. 1988).

Dipl. –Ing. U. Melcinger, Prof. Dr. –Ing. W. Poppy "Elektronisch geregeltes Drei–Pumpen–System" (Electronically controlled Three–Pump–System), *Ölhydraulik und pneumatik*, pp. 549–553 (1988).

Dr. –Ing. P. Wüsthof, Lohr/Main "Verbesserte Energieausnutzung in der Mobilhydraulik" (Improved Power Exploitation in Mobile Hydraulics) *Ölhydraulik und pneumatik* pp. 637–643 (1986).

Dipl. Ing. N. Rückgauer, Ulm, Hydraulische Antriebe im Kranbau (Hydraulic Drives in Crane Construction), *Ölhydraulik und pneumatik* pp. 150–163 (1986).

Dr. –Ing. H. Hesse, "Elektronik in der Mobilhydraulik" (Electronics in Mobile Hydraulics) *Ölhydraulik und pneumatik*, pp. 537–548; (1988).

Liebherr "Diesel–Hydraulic Floating Crane" *Betriebsanleitung Instruction manual Manual d'instruction* 1st Edition: 400 pages; 24th of Sep., 1986.

LR 1650/800 Betriebsanleitung Operating Instructions, *Liebherr*, 89 pages (Feb. 1987).

The Liebherr "Technical Data Cable Excavator" (Oct. 1986).

The Liebherr Technical Description: HS 840, HS 850, HS 870 (Apr. 1985).

Rewico shipping document (German and English, 2 pp.) (03/78).

Confirmation order for LR1300 on Liebherr letterhead (German only, 1 p.) (12/76).

Special Customs Invoice (1 p.) (04/78).

Machine document order No. 0010540 for LR1300 (German only, 1 p.) (05/78).

Machine document order No. 0010540 for LR1300 (German only, 3 pp.) (02/78).

Hydraulik/Hydraulic LR1300 Schematic (English and German, 1 p.) (10/78).

Mannesmann Rexroth, Micro–Controller MC Series 10, Model RD 95050/08.87 (German, 4 pp. and 5 pp. of English translation) (03/87).

Dr. Eng S. Miyakawa, "Dynamisches Verhalten eines Hubwerks mit einem geschlossenen Hydralikkreislauf" (Dynamic response of a hoist unit with a closed hydraulic circuit), MobilHydraulik, olhydraulik und pneumatik, (German, 4 pp. and 8 pp. of English translation) (1987).

Mannesmann Rexroth, Product Description Sheet for Pressure Memory Switch, 2 pages, (Jan. 1982).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 12, lines 16–39:

Referring again to FIG. 4, the second preferred embodiment also includes a direct connection 290 between a set 292 of operator controls and a set 294 of mechanical subsystems to enable this set of mechanical subsystems to be operated directly by the operator controls 292 instead of being operated through the programmable controller 212. The mechanical subsystems which may be operated outside the control of the programmable controller include the boom pawl and the right and left and front and rear diverting valves. These mechanical subsystems are operated directly instead of through the programmable controller because their operation is not considered to be specifically enhanced or benefitted by computer control. The selection of mechanical subsystems operated directly may be made depending upon considerations associated with the specific use of the liftcrane. Although operation of this set [292] *294* of mechanical subsystems is not under the programmable controller 212, switches associated with their operation may be connected to the programmable computer 212 to provide an output 296 thereto in order to provide an indication of the operation of one or more of this set [292] *294* of mechanical subsystems.

Column 12, line 40 to Column 13, line 2:

In this second preferred embodiment of the present invention, a remote control panel 300 is also included. The remote control panel 300 is connected to the liftcrane by a tether cable (not shown) so that certain of the mechanical subsystems of the liftcrane can be controlled remotely, e.g. by an operator standing outside of the cab. Preferably the tether is disconnectable from the liftcrane so that the remote control panel 300 can be removed when not in use, if desired. In this second preferred embodiment, the remote control panel 300 may be used to operate certain mechanical subsystems through the programmable controller 212 and also operate certain other functions directly. Accordingly, the remote control panel 300 is connected both to the programmable controller 212 by a line 304 as well as to a set 302 of mechanical subsystems. In this embodiment, the mechanical subsystems that can be controlled directly by the remote control panel include the crawler extension, part of the gantry raising system, and the counterweight pins. The mechanical subsystems controlled by the remote control panel through the programmable controller include the boom hoist, movable counterweight and carrier and the movable counterweight beam, as disclosed in the aforementioned co-pending application, Ser. No. 07/269,222, U.S. Pat. No. 4,953,722 incorporated herein by reference. The selection of which mechanical subsystems are operated by the remote control panel through the programmable controller depends on the specific design of the liftcrane manufacturer with a consideration of the purposes for which the liftcrane will *be* used.

Column 13, lines 3–16:

The second preferred embodiment also includes an operator's display system connected to the programmable controller. An operator's display 310 is positioned in the cab 203 and conveys to the operator information about the status of the liftcrane mechanical subsystems. The display 310 can be a monitor of the CRT or LCD type, or the like, selected for heavy duty use. The display 310 is capable of presenting information from any of the sensors or operator controls 202 which are connected to the programmable controller 212. For example, the display [212] *310* can show to the operator air pressure, charge pressure, engine oil pressure, main hydraulic system pressure, fuel level, battery voltage, engine water temperature, engine speed, hoist drum speed, etc.

AS A RESULT OF REEXAMINATION, IT HAS BEEN DETERMINED THAT:

Claims 16, 17 and 20–23 are cancelled.

Claims 1, 8, 10–14 and 18 are determined to be patentable as amended.

Claims 2–7, 9, 15 and 19, dependent on an amended claim, are determined to be patentable.

New claims 24–81 are added and determined to be patentable.

1. A control system for a liftcrane having mechanical subsystems powered by an engine and connected thereto by a closed loop hydraulic system having individual closed hydraulic loops associated with the mechanical subsystems, comprising:

*a memory;* a first mechanical subsystem powered by the engine and connected thereto by a first closed hydraulic loop*, wherein the first mechanical subsystem includes a hoist and a brake, wherein said brake prevents a load of the liftcrane from slipping when said brake is set*, a first set of controls for outputting signals for operation of said first mechanical subsystem, a first sensor operable to sense the pressure in the closed hydraulic loop and for outputting signals indicative thereof*, wherein said first sensor is associated with said hoist, and wherein a pressure sensed by said first sensor is stored in said memory at a time when the brake is applied to said hoist*, a mode selector for providing an operator with a selection of alternative modes of liftcrane mechanical subsystem operation and adapted to output a signal representative of said selection and wherein at least two of the alternative modes of liftcrane mechanical subsystem operation are fully operational modes; and a programmable controller connected to said *first* set of controls, said first sensor, and said mode selector, said programmable controller adapted to run a routine operable to output signals to said first mechanical subsystem for the operation thereof based upon the signals output by said *first* set of controls, said first sensor, and said mode selector.

8. A control system for operation of *a* liftcrane having mechanical subsystems powered by a engine, each mechanical subsystem connected thereto by an individual closed hydraulic loop, comprising:

*a memory;* a first mechanical subsystem powered by the engine and connected thereto by a closed hydraulic loop*, wherein the first mechanical subsystem includes a brake and a hoist, wherein the brake holds the hoist and prevents a load of the liftcrane from slipping when the brake is set*, a first set of controls for outputting signals for operation of said first mechanical subsystem, a first sensor operable to sense the pressure in the closed hydraulic loop connected to said first mechanical subsystem and to provide an output signal indicative thereof, and a programmable controller connected to said first set of controls, said first sensor, and said first mechanical subsystem*, wherein said first sensor is associated with said hoist, and wherein a pressure sensed by said first sensor is stored in said memory at a time when the brake is applied to said hoist*, a mode selector for selecting a desired mode of operation of the first mechanical subsystem, and an operating routine adapted to run on said programmable controller, said operating routine comprising:

first information corresponding to a range of possible signals that can be received from said first set of controls, and at least two sets of second information, each set corresponding to a range of possible operations of said first mechanical subsystem, said first information being related to each of said sets of second information, and further wherein one of said sets of second information is related to the first information based upon an input from the mode selector, whereby said first mechanical subsystem can be operated in accordance with an operating routine run on said programmable controller based upon the output signals of said first set of controls and said first sensor.

10. The [improved] control system of claim 9 further comprising:

an operating routing stored in a memory of said programmable controller, said operating routine comprising executable instructions for the control and operation of mechanical subsystems of the liftcrane based upon inputs from said controls and sensors.

11. An improved control system for a liftcrane having a plurality of mechanical subsystems powered by an engine and each connected thereto by an individual closed hydraulic loop, the system comprising:

*a memory;* a set of controls for outputting signals for operation of the mechanical subsystems of the liftcrane, a set of sensors operable to sense the pressure in at least some of the closed hydraulic loops and for outputting signals indicative thereof,

*further including a brake included with a hoist of the liftcrane, wherein the brake prevents a load of the liftcrane from slipping when the brake is set,*

*wherein one of said sensors is associated with said hoist, and wherein a pressure sensed by said sensor is stored in said memory at a time when the brake is applied to said hoist,* a mode selector for providing and operator with a selection of alternative modes of liftcrane mechanical subsystem operation and adapted to output a signal representative of said selection and wherein at [last] *least* two of the alternative modes of liftcrane mechanical subsystem operation are fully operational modes; and a programmable controller connected to said set of controls, said mode selector, and said set of sensors, said programmable controller adapted to run a routine operable to output signals to the mechanical subsystems for the control thereof based upon the signals output by said set of controls, said mode selector, and said [first] set of sensors.

12. The system of claim 11 further comprising:

a diverting valve interconnecting at least two of said closed hydraulic loops, said diverting valve connected to said programmable controller whereby upon operation of said controls under control of said programmable controller, hydraulic [pressure] *flow* can be diverted between closed hydraulic loops.

13. An improved method for controlling operation of a liftcrane having [and] *an* engine and mechanical subsystems each powered by a closed hydraulic loop driven by the engine, comprising the steps of:

lifting a load with a hoist and a boom;

applying a brake to the hoist to prevent the load from slipping, sensing with a sensor associated with the hoist the application of the brake to the hoist;

storing data in a memory indicative of the pressure sensed by the sensor associated with the hoist at the time when the brake is applied to said hoist;

applying pressure to the hoist equal to the pressure indicated by the data stored in the memory; and releasing the brake.

14. An improved method for performing clamshell work with a liftcrane having an engine and mechanical subsystems each powered by a closed hydraulic loop driven by the engine, comprising the steps of:

supporting a [the] load in a clamshell with a first line connected to a hoist drum;

sensing the pressure in a first closed hydraulic loop connected to a first pump associated with the hoist drum, outputting a signal indicative of the pressure sensed in the first closed hydraulic loop to a programmable controller, and commanding with the programmable controller a second pump associated with a second hoist drum to maintain a force on a second line connected to the clamshell, said force *being* related to the pressure sensed in the first closed hydraulic loop.

18. An improved method for controlling operation of a liftcrane having an engine and a [hose] *hoist* powered by a closed hydraulic loop driven by the engine, comprising the steps of:

lifting a load with the hoist;

applying a brake to the hoist to prevent the load from slipping, storing data in a computer memory indicative of the pressure in the closed hydraulic loop that powers the hoist when the brake is applied to said hoist;

applying pressure to the hoist at least equal to the pressure indicated by the data stored in the computer memory; and releasing the brake.

*24. The control system of claim 1 wherein the mode selector includes at least a counterweight handling mode.*

*25. The control system of claim 1 wherein the mode selector includes at least a crawler extension mode.*

*26. The control system of claim 1 wherein the mode selector includes at least a high speed mode.*

*27. The control system of claim 1 wherein the mode selector includes at least a clamshell mode.*

*28. The control system of claim 1 wherein the mode selector includes at least a free-fall mode.*

*29. The control system of claim 1 wherein the mode selector tailors the operation of the liftcrane for a particular task being performed.*

30. The control system of claim 1 wherein the programmable controller provides information regarding the mechanical subsystems to an operator.

31. The control system of claim 1 wherein the routine operates continuously on the programmable controller.

32. The control system of claim 1 wherein the programmable controller can provide play back of a liftcrane operation.

33. The control system of claim 1 wherein the first set of controls includes at least one variable control and at least one switch control located in a cab of the liftcrane and being controllable by a liftcrane operator, wherein the variable control produces variable outputs and the switch control produces on/off outputs, and wherein said programmable controller is separately responsive to variable outputs of the variable control and the on/off outputs of the switch control.

34. The control system of claim 33 wherein signals from all of the controls of the liftcrane are fed through the programmable controller.

35. The control system of claim 9 further comprising:

a second set of controls connected to and adapted to operate said second mechanical subsystem.

36. The control system of claim 9 further comprising:

a third sensor adapted and operable to sense operation of a second set of controls, said third sensor also connected to and operable to provide an output to said programmable controller indicative of the status of operation of said second mechanical subsystem.

37. The control system of claim 9 further comprising:

a remote control panel connected to and adapted to output signals to said programmable controller for operation of said first mechanical subsystem.

38. The control system of claim 37 further comprising:

a third mechanical subsystem powered by the engine and connected thereto by a third closed hydraulic loop, said third mechanical subsystem connected to and adapted to be operated by said remote control panel.

39. The control system of claim 8 further comprising:

a remote control panel connected to and adapted to output signals to said programmable controller for operation of said first mechanical subsystem.

40. The control system of claim 8 further comprising:

a display connected to said programmable controller, said display adapted to indicative to an operator of the liftcrane the status of operation of said first mechanical subsystem.

41. The control system of claim 8 wherein the mode selector includes at least a counterweight handling mode.

42. The control system of claim 8 wherein the mode selector includes at least a crawler extension mode.

43. The control system of claim 8 wherein the mode selector includes at least a high speed mode.

44. The control system of claim 8 wherein the mode selector includes at least a clamshell mode.

45. The control system of claim 8 wherein the mode selector includes at least a free-fall mode.

46. The control system of claim 8 wherein the mode selector tailors the operation of the liftcrane for a particular task being performed.

47. The control system of claim 8 wherein the programmable controller provides information regarding the mechanical subsystems to an operator.

48. The control system of claim 8 wherein the routine operates continuously on the programmable controller.

49. The control system of claim 8 wherein the programmable controller can provide play back of a liftcrane operation.

50. The control system of claim 8 wherein the first set of controls include at least one variable control and at least one switch control located in a cab of the liftcrane and being controllable by a liftcrane operator, wherein the variable control produces variable outputs and the switch control produces on/off outputs, and wherein said programmable controller is separately responsive to variable outputs of the variable control and the on/off outputs of the switch control.

51. The control system of claim 50 wherein the signals from all of the controls of the liftcrane are fed through the programmable controller.

52. The control system of claim 11 further comprising:

at least one additional sensor operable to sense the position or speed of at least one of said plurality of mechanical subsystems, said sensor also connected and operable to provide an output to said programmable controller indicative of the position or speed of said at least one mechanical subsystem, and further in which said programmable controller is adapted to run a routine operable to output signals to said at least one mechanical subsystem for the operation thereof based upon the outputs of said set of controls and said additional sensor.

53. The control system of claim 52 wherein the plurality of mechanical subsystems further includes a second mechanical subsystem powered by the engine and connected thereto by a second closed hydraulic loop, and a second set of controls connected and adapted to operated said second mechanical subsystem.

54. The control system of claim 53 further comprising:

at least one additional sensor adapted and operable to sense operation of said second set of controls, said sensor also connected and operable to provide an output to said programmable controller indicative of the status of operation of said mechanical subsystem.

55. The control system of claim 11 further comprising:

a remote control panel connected to and adapted to output signals to said programmable controller for operation of at least one of said plurality of mechanical subsystems.

56. The control system of claim 11 further comprising:

a display connected to said programmable controller, said display adapted to indicate to an operator of the liftcrane the status of operation of said plurality of mechanical subsystems.

57. The control system of claim 11 wherein said fully operational modes include at least a counterweight handling mode.

58. The control system of claim 11 wherein said fully operational modes include at least a crawler extension mode.

59. The control system of claim 11 wherein said fully operational modes include at least a high speed mode.

60. The control system of claim 11 wherein said fully operational modes include at least a clamshell mode.

61. The control system of claim 11 wherein said fully operational modes include at least a free-fall mode.

62. The system of claim 11 wherein at least one of said set of sensors is operable to sense the position or speed of one of the mechanical subsystems, and operable to provide an output to said programmable controller indicative of the position or speed of said one of the mechanical subsystems.

63. The system of claim 11 further comprising:

a remote control panel connected to and adapted to output signals to said programmable controller for operation of one or more of the mechanical subsystems.

64. The system of claim 11 further comprising:

a display connected to said programmable controller, said display adapted to indicate to an operator of the liftcrane the status of operation of at least one of the mechanical subsystems.

65. The system of claim 11 wherein the mode selector includes at least a counterweight handling mode.

66. The system of claim 11 wherein the mode selector includes at least a crawler extension mode.

67. The system of claim 11 wherein the mode selector includes at least a high speed mode.

68. The system of claim 11 wherein the mode selector includes at least a clamshell mode.

69. The system of claim 11 wherein the mode selector includes at least a free-fall mode.

70. The system of claim 11 wherein the mode selector tailors the operation of the liftcrane for a particular task being performed.

71. The system of claim 11 wherein the programmable controller provides information regarding the mechanical subsystems to an operator.

72. The system of claim 11 wherein the routine operates continuously on the programmable controller.

73. The system of claim 11 wherein the programmable controller can provide play back of a liftcrane operation.

74. The control system of claim 11 wherein the set of controls include at least one variable control and at least one switch control located in a cab of the liftcrane and being controllable by a liftcrane operator, wherein the variable control produces variable outputs and the switch control produces on/off outputs, and wherein said programmable controller is separately responsive to variable outputs of the variable control and the on/off outputs of the switch control.

75. The control system of claim 74 wherein signals from all of the controls of the liftcrane are fed through the programmable controller.

76. The method of claim 18 further comprising the steps of:

outputting a signal from a control handle to a programmable controller to indicate a desired operation of swing; and outputting a signal from the programmable controller to a pump to operate the swing based upon the signal received from the control handle.

77. The method of claim 18 in which said liftcrane further comprises multiple mechanical subsystems each connected to the engine by a closed hydraulic loop, and a diverting valve interconnecting at least two of said closed hydraulic loops, and the method further comprises the steps of:

operating controls to effect a desired operation of one of said mechanical subsystems, outputting a signal from a programmable controller to operate said diverting valve to divert hydraulic flow from a closed hydraulic loop associated with another of said mechanical subsystems to a closed hydraulic loop associated with the one mechanical subsystem, whereby the one mechanical subsystem can be powered by the closed hydraulic loops associated with both the one and the other mechanical subsystem.

78. The method of claim 77 in which said multiple mechanical subsystems include the hoist and a boom and in which the desired liftcrane operation is to move a load horizontally at a desired height, the method further comprising the steps of:

operating said controls to produce a signal to indicate operation of the hoist to lift a load to the desired height;

outputting a signal from said programmable controller to operate said hoist to lift the load to the desired height;

operating said controls to produce a signal to indicate operation of said hoist and said boom together to move the load horizontally at the given height;

calculating with said programmable controller operation of said boom and said hoist together to move the load horizontally at the given height;

outputting from said programmable controller signals to said boom and to said hoist to operate each to move the load horizontally at the given height.

79. A control system for a liftcrane having mechanical subsystems powered by an engine and connected thereto by a closed loop hydraulic system having individual closed hydraulic loops associated with the mechanical subsystems, comprising:

a first mechanical subsystem powered by the engine and connected thereto by a first closed hydraulic loop, a first set of controls for outputting signals for operation of said first mechanical subsystem, a first sensor operable to sense the pressure in the closed hydraulic loop and for outputting signals indicative thereof, a mode selector for providing an operator with a selection of alternative modes of liftcrane mechanical subsystem operation and adapted to output a signal representative of said selection and wherein at least two of the alternative modes of liftcrane mechanical subsystem operation are fully operational modes, wherein the mode selector selects between torque and displacement operating characteristics of one or more of the mechanical subsystems; and a programmable controller connected to said first set of controls, said first sensor, and said mode selector, said programmable controller adapted to run a routine operable to output signals to said first mechanical subsystem for the operation thereof based upon the signals output by said first set of controls, said first sensor, and said mode selector.

80. A control system for operation of a liftcrane having mechanical subsystems powered by a engine, each mechanical subsystem connected thereto by an individual closed hydraulic loop, comprising:

a first mechanical subsystem powered by the engine and connected thereto by a closed hydraulic loop, a first set of controls for outputting signals for operation of said first mechanical subsystem, a first sensor operable to sense the pressure in the closed hydraulic loop connected to said first mechanical subsystem and to provide an output signal indicative thereof, and a programmable controller connected to said first set of controls, said first sensor, and said first mechanical subsystem, a mode selector for selecting a desired mode of operation of the first mechanical subsystem, wherein the mode selector selects between torque and displacement operating characteristics of one or more of the mechanical subsystems, and an operating routine adapted to run on said programmable controller, said operating routing comprising:

first information corresponding to a range of possible signals that can be received from said first set of controls, and

*at least two sets of second information, each set corresponding to a range of possible operations of said first mechanical subsystem, said first information being related to each of said sets of second information, and further wherein one of said sets of second information is related to the first information based upon an input from the mode selector,*

*whereby said first mechanical subsystem can be operated in accordance with an operating routine run on said programmable controller based upon the output signals of said first set of controls and said first sensor.*

*81. An improved control system for a liftcrane having a plurality of mechanical subsystems powered by an engine and each connected thereto by an individual closed hydraulic loop, the system comprising:*

*a set of controls for outputting signals for operation of the mechanical subsystems of the liftcrane,*

*a set of sensors operable to sense the pressure in at least some of the closed hydraulic loops and for outputting signals indicative thereof,*

*a mode selector for providing an operator with a selection of alternative modes of liftcrane mechanical subsystem operation and adapted to output a signal representative of said selection and wherein at least two of the alternative modes of liftcrane mechanical subsystem operation are fully operational modes, wherein the mode selector selects between torque and displacement operating characteristics of one or more of the mechanical subsystems; and*

*a programmable controller connected to said set of controls, said mode selector, and said set of sensors, said programmable controller adapted to run a routine operable to output signals to the mechanical subsystems for the control thereof based upon the signals output by said set of controls, said mode selector, and said set of sensors.*

* * * * *